United States Patent [19]
Okada et al.

[11] Patent Number: 6,065,881
[45] Date of Patent: May 23, 2000

[54] OPTICAL TRANSMISSION LINE FORMING METHOD AND APPARATUS, AND OPTICAL CIRCUIT

[75] Inventors: Junji Okada; Masaki Hirota; Masahiro Taguchi; Kenji Kawano; Masao Funada; Takashi Ozawa, all of Nakai-machi, Japan

[73] Assignee: Fuji Xerox Co., Ltd., Tokyo, Japan

[21] Appl. No.: 09/165,090

[22] Filed: Oct. 2, 1998

Related U.S. Application Data

[62] Division of application No. 08/774,375, Dec. 27, 1996, Pat. No. 5,955,010.

[30] Foreign Application Priority Data

Jan. 5, 1996 [JP] Japan ................................ 8-000202
Dec. 19, 1996 [JP] Japan ................................ 8-340204

[51] Int. Cl.[7] ........................................... G02B 6/36
[52] U.S. Cl. .................... 385/88; 385/14; 385/49; 385/50; 385/129; 385/130
[58] Field of Search .................. 385/14, 88, 49, 385/50, 89, 129–132; 156/244.11, 244.12; 264/1.1, 1.25, 1.24, 1.27

[56] References Cited

U.S. PATENT DOCUMENTS

| | | | |
|---|---|---|---|
| 5,317,657 | 5/1994 | Gallo et al. | 385/14 |
| 5,367,593 | 11/1994 | Lebby et al. | 385/14 |
| 5,473,721 | 12/1995 | Myers et al. | 385/129 |
| 5,534,101 | 7/1996 | Keyworth et al. | 385/123 |

FOREIGN PATENT DOCUMENTS

| | | |
|---|---|---|
| 1-269903 | 10/1989 | Japan . |
| 5-88028 | 4/1993 | Japan . |

*Primary Examiner*—Hemang Sanghavi
*Attorney, Agent, or Firm*—Oliff & Berridge, PLC

[57] ABSTRACT

An optical transmission line is formed and thereafter solidified using an optical transmission line forming material in the fluid condition. The optical transmission line formed between optical transmission terminals assures higher reliability and never generates disconnection or internal stress therein.

20 Claims, 22 Drawing Sheets

OPTICAL TRANSMISSION LINE FORMING METHOD AND APPARATUS, AND OPTICAL CIRCUIT

This is a Division of application Ser. No. 08/774,375 filed Dec. 27, 1996 now U.S. Pat. No. 5,955,010. The entire disclosure of the prior application is hereby incorporated by reference herein in its entirety.

BACKGROUND OF THE INVENTION

1. Field of the Invention

The present invention relates to an optical transmission line forming method to form an optical transmission line between optical transmission terminals connected by the optical transmission line to transmit optical signal via the optical transmission line, an apparatus for implementing such method and an optical circuit formed by such method.

2. Description of the Prior Art

Electrical wiring method has been popular as a connecting method of electronic circuits. However, with progress of the processing rate of the circuits in the recent years, electrical wirings cannot realize accurate signal transmission due to signal delay, waveform distortion or the like. For these reasons, a so-called optical interconnection technology has been proposed to transmit signals with an optical transmission line which has been enabled by replacing an electrical signal into an optical signal. However, here rises a problem that mounting and assembling are difficult because the optical interconnection technology requires the accuracy as high as several $\mu$m or less for coupling between a light emitting element and a light receiving element or an optical waveguide.

Moreover, as a method of connecting an optical waveguide with a light emitting element, a non-contact type optical coupler has been proposed to perform indirect connection, in place of the direct connection, by propagating the light signal in the space. However, such a non-contact type optical coupler introduces a measure, in order to make small a coupling loss, to process the end part of an optical fiber provided opposed to the light emitting means into a shape of lens but provides more complicated mounting (aligning) process. Since the optical connection between an optical fiber and light emitting and receiving elements of the related art is required to provide the light emitting and receiving surfaces on the upper surface of a die to couple these elements with the light from or to the upper direction, the end part of the optical fiber is cut and polished in the angle of 45 degrees and simultaneous control is also required for rotation of fiber around the optical axis and three axes XY θ for axial alignment. As a result, the positioning cost takes the greater part of the mounting cost.

In view of overcoming this problem, the official gazettes of the Japanese Published Unexamined Patent Application Nos. Hei 269903 and 88028 propose the method of optically coupling elements by connecting in direct the optical fiber with an element by the wire bonding method.

However, when an optical semiconductor apparatus of the related art, utilizing an optical fiber to form an optical transmission line between the optical transmission terminals which will become an optical signal transmitting end or receiving end, introduces the mounting method similar to the wire bonding method, if the optical fiber is bent for the purpose of wire bonding, the optical fiber will be broken at this bending area, substantially disabling the connection because the optical fiber does not have such flexibility as freely assuring wire bonding for connection in the length from several $\mu$m to several mm. In addition, even if the optical fiber does not break and the wire bonding can be performed, since a shearing stress is always applied to the coupling area between the light emitting element and light receiving element or optical waveguide, here rises such a reliability problem that the coupling area will generate separation of bonding to a considerable extent.

SUMMARY OF THE INVENTION

The present invention has been proposed considering the background explained above and it is therefore an object of the present invention to provide a highly reliable optical transmission line forming method for preventing generation of breakdown or existence of the shearing stress on the occasion of connection of optical transmission terminals with an optical transmission line, an apparatus suitable for implementing such method and an optical circuit formed by the method explained above.

The optical transmission line forming method of the present invention to achieve the object explained above is provided to form an optical transmission line between optical transmission terminals connected to the optical transmission line for optical transmission via the optical transmission line, which is characterized in comprising:

(1) first connecting process for supplying a coagulative optical transmission line forming material in the fluid condition to the first optical transmission terminal of the optical transmission terminals to connect the optical transmission line forming material to such first optical transmission terminal;

(2) optical transmission line bridging process for bridging the coagulative optical transmission line forming material in the fluid condition to be connected to the optical transmission line forming material connected to the first optical transmission terminal to the second optical transmission end among the optical transmission terminals from the first optical transmission terminal; and (3) second connecting process for connecting the optical transmission line forming material bridged between the first optical transmission terminal and second optical transmission terminal to the second optical transmission line.

Here, the "fluid condition" in the present invention means that the optical transmission line forming material is in the fluid condition before it is solidified and this fluid condition includes both melting condition where a material to be heated (here, an optical transmission line forming material) is softened by heating process until the material is melted up to the fluid condition and the melting condition where a solute (here, optical transmission line forming material) is fused into a solvent until the solute is in the fluid condition.

In the optical transmission line forming method of the present invention, the optical transmission line is formed of the optical transmission line forming material in the fluid condition and it is solidified during formation or after formation thereof. Therefore, generation of breakdown and shearing stress can be prevented and highly reliable optical transmission line can be formed.

Here, in the optical transmission line forming method of the present invention, the optical transmission line bridging process may be the process for bridging the optical transmission line forming material up to the second optical transmission terminal, while continuation of supply of the optical transmission line forming material, following the optical transmission line forming material supplied to the first optical transmission line end, or the process for bridging the optical transmission line forming material up to the second optical transmission terminal, while pulling the optical transmission line forming material supplied to the first optical transmission line end.

Moreover, the optical transmission line forming method of the present invention is preferably provided with a solidification accelerating process for giving energy (for example, thermal energy, optical energy, etc.) to or taking energy (for example, thermal energy, etc.) from the optical transmission line forming material to form an optical transmission line during or after bridging the optical transmission line forming material to the second optical transmission terminal from the first optical transmission terminal in order to accelerate solidification of such optical transmission line forming material.

Furthermore, in case the optical transmission line forming method of the present invention is applied as an optical transmission line forming method to form an optical transmission line of a double-layer structure consisting of core and clad, the optical transmission line bridging process is preferably the process for bridging the optical transmission line forming material in the double-layer structure wherein the coagulative first material to form a core in the fluid condition is surrounded by a coagulative second material to form a clad in the fluid condition.

Otherwise, when the optical transmission line forming method of the present invention is applied as an optical transmission line forming method to form an optical transmission line of double-layer structure consisting of the core and clad as the optical transmission line explained above, the optical transmission line bridging process may be the process for bridging the coagulative first material to form the core in the fluid condition, provided with a clad forming process for covering, after the second connecting process, the first material bridged between the first optical transmission line end and the second transmission line end with a coagulative second material.

Moreover, the optical transmission line forming method of the present invention is preferably provided with a light shielding process for shielding the optical transmission line, after forming the optical transmission line, from the light coming from the part other than the optical transmission line, with a shielding material.

Further, in the optical transmission line forming method of the present invention, it is preferable, when the optical transmission line terminal is shared respectively as the optical transmission terminal in the light emitting side and that in the light receiving side, to form an optical transmission line between these optical transmission line ends in the light emitting and receiving sides defining as the first optical transmission terminal and second optical transmission terminal.

Moreover, the optical transmission line forming apparatus of the present invention which is suitable for implementation of the optical transmission line forming method of the present invention applies an optical transmission line forming apparatus to form an optical transmission line, between optical transmission terminals, of the optical transmission line forming body having the optical transmission terminals connected to the transmission line to perform optical transmission via the optical transmission line, comprising:

(1) a nozzle for ejecting a coagulative optical transmission line forming material in the fluid condition;

(2) a moving means for relatively moving the nozzle in the three-dimensional directions with respect to the optical transmission line forming body explained above;

(3) an ejecting means for suspendably ejecting the optical transmission line forming material in the fluid condition from the nozzle;

(4) a control means for moving, by controlling the moving means and ejecting means, the nozzle to the position of the first optical transmission terminal of the optical transmission terminals, supplying the optical transmission line forming material in the fluid condition to the first optical transmission terminal from the nozzle to connect the optical transmission line forming material to the first optical transmission terminal to move the nozzle to the position of the second optical transmission terminal from the position of the first optical transmission terminal and moving the nozzle to the position of the second optical transmission line terminal from the position of the first optical transmission line terminal to connect the optical transmission line forming material to the second optical transmission line terminal in view of bridging the optical transmission line forming material in the fluid condition, following the optical transmission line forming material connected to the first optical transmission terminal, to the second optical transmission terminal of the optical transmission line from the first optical transmission terminal.

Here, the optical transmission line forming apparatus of the present invention may be provided with a solidification accelerating means (for example, heating means, light radiating means, etc.) for giving energy to accelerate solidification of the optical transmission line forming material to such optical transmission line forming material to form the optical transmission line during or after bridging the optical transmission line forming material to the second optical transmission line terminal from the first optical transmission terminal or a solidification accelerating means (for example, cooling means, blowing means, etc.) for taking energy from the optical transmission line forming material to accelerate solidification of the transmission line forming material.

Moreover, when the optical transmission line forming apparatus of the present invention is the optical transmission line forming apparatus to form, as the optical transmission line, the optical transmission line of the double-layer structure consisting of core and clad, the nozzle is preferably provided with a double-tube structure for injecting the coagulative first material to form the core in the fluid condition and the coagulative second material, surrounding the first material, to form clad in the fluid condition.

The nozzle explained above is not particularly limited in its structure when the optical transmission line forming material is in the fluid condition on the occasion of ejecting the coagulative optical transmission line forming material from the nozzle. Namely, it is also possible to provide a heating means to the nozzle or in the periphery of nozzle so that the optical transmission line forming material is supplied in the solidified condition, for example, as the powder or line condition, up to the inlet part of nozzle and this material is heated in the nozzle up to the melted condition when it is injected from the nozzle, or it is possible to provide a tank, in addition to the nozzle, to keep the optical transmission line forming material in the melted condition and thereby the optical transmission line forming material in the tank can be maintained in the melted condition by heating the material in the tank in order to supply the melted optical transmission line forming material in the fluid condition to the nozzle. Moreover, the optical transmission line forming material is not always required to be fused when it is heated. For example, it is also possible that the thermocoagulative optical transmission line forming material in the fluid condition under the normal temperature is injected from the nozzle to form the optical transmission line and it is then solidified when heat is applied thereto. In addition, the optical transmission line forming material is not required to be the material melted or coagulated with the thermal energy. For example, the material having the property that it is in the melted condition in the solvent but it is coagulated when the solvent is removed with heat or wind or the like can also be used and the material which is coagulated when optical energy is applied thereto in the melted condition can also be used. For the nozzle, it is enough that when it can inject the optical transmission line forming material to be used to form the optical transmission line under the fluid condition and the nozzle may also be formed in various designs depending on the property of the optical transmission line forming material to be used.

Moreover, an optical circuit of the present invention is the optical circuit which is constituted by forming an optical transmission line between the optical transmission line terminals connected to the optical transmission line to enable the optical transmission via the optical transmission line and is characterized in that it is formed through:

first connecting process for supplying coagulative optical transmission line forming material in the fluid condition to the first optical transmission line terminal of the optical transmission line terminals to connect the optical transmission line material to the first optical transmission line terminal;

optical transmission line bridging process for bridging the coagulative optical transmission line forming material in the fluid condition, following the optical transmission line forming material connected to the first optical transmission line terminal to the second optical transmission line terminal of the optical transmission line terminals from the first optical transmission line terminal; and second connecting process for connecting the optical transmission line forming material bridged between the first and second optical transmission line terminals to the second optical transmission line terminal.

DETAILED DESCRIPTION OF PREFERRED EMBODIMENTS

The preferred embodiments of the present invention will be explained in detail by referring to the accompanying drawings.

Figure 1:
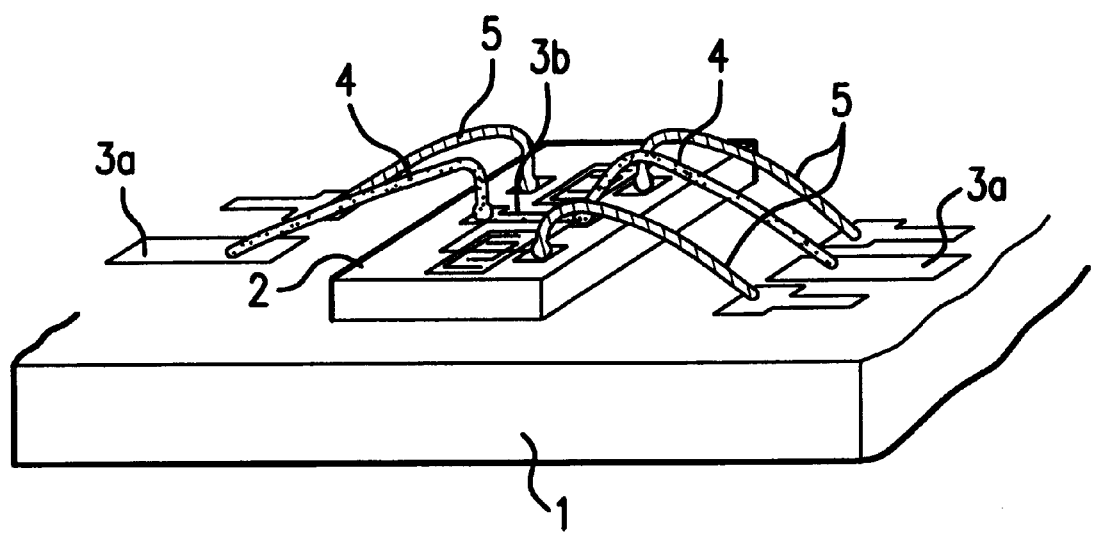
FIG. 1 is a perspective view illustrating the essential portion of a common optical interconnection of respective embodiments of the present invention.

FIG. 1 is a perspective view illustrating the essential portion of the optical interconnection common to respective embodiments of the present invention which will be explained below.

An optical-electronic integrated circuit 2 having a light emitting and light receiving elements and electronic circuits formed on Si wafer, GaAs wafer or the like is mounted on a glass or LiNbO$_3$ substrate 1. On the substrate 1, an optical waveguide 3a is also formed to transmit the signals to an optical input terminal of the other optical-electronic integrated circuit from an optical output terminal of one optical-electronic integrated circuit. The optical waveguide 3a is formed by the ion exchange of Cs$^+$, Rb$^+$, Li$^+$, Ag$^+$, etc. to glass or the like or by ion diffusion of V, Ni, Cu, Ti, etc. to LiNbO$_3$ or the like. Moreover, the deposition and etching are repeated by formation of oxide film and nitride film such as SiO$_2$, Si$_3$N$_4$, etc. through, for example, CVD and sputtering or AlGaAs epitaxial growth by ion implantation, electron beam on the Si wafer and GaAs wafer, etc. to form an optical waveform 3b. The optical waveguides 3a and 3b are connected, as characterized, with a transmission line forming material in the fluid condition and is also coupled optically with an optical transmission line 4 formed by the solidified optical transmission line forming material. Meanwhile, the electrical connecting terminals are electrically coupled with a wire 5 by the wire bonding method of the related art utilizing a gold wire, etc.

Figure 2:
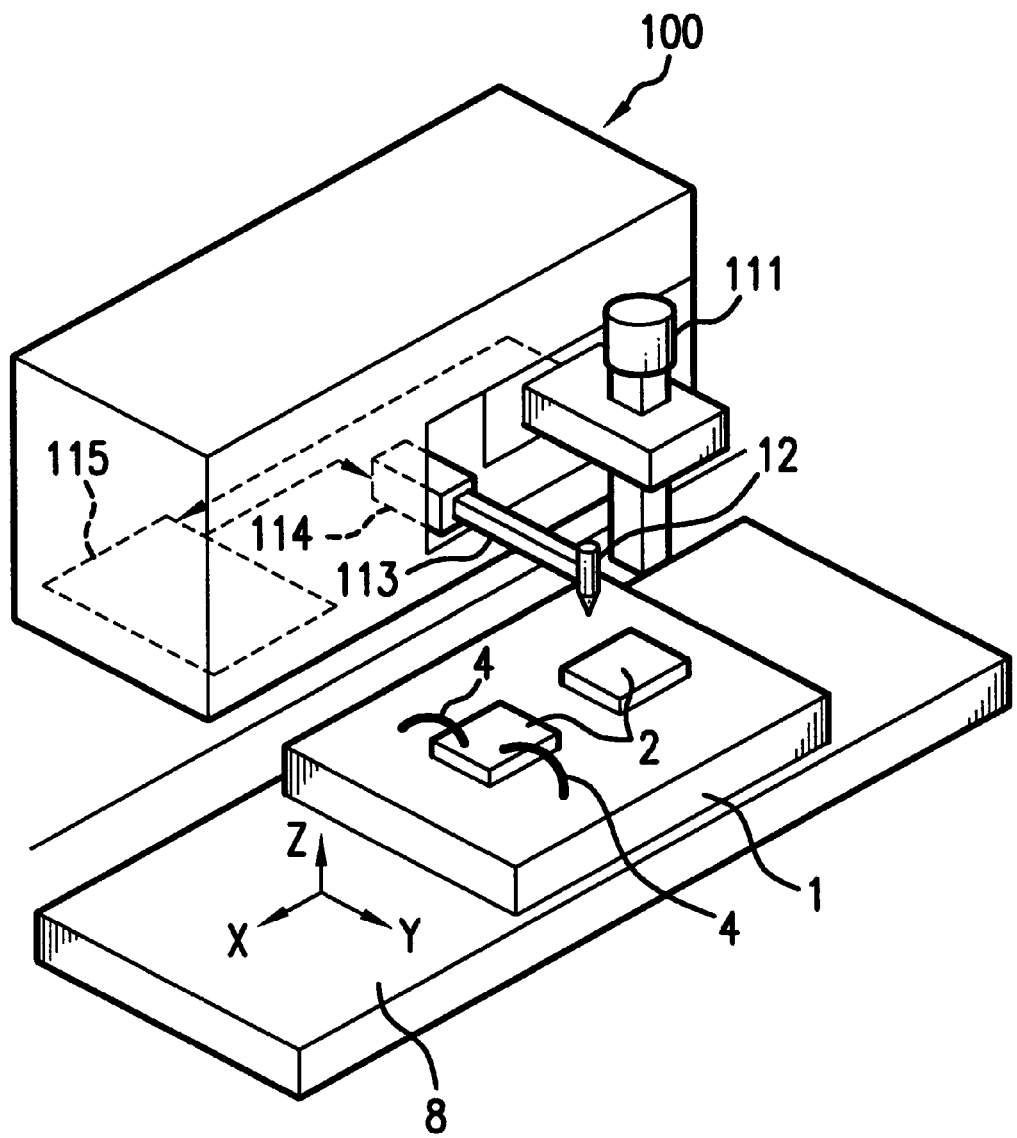
FIG. 2 is a schematic structural diagram of a common optical transmission line forming apparatus of respective embodiments of the present invention.

FIG. 2 is a schematic structural diagram of the optical transmission line forming apparatus common to respective embodiments explained below.

A substrate 1 mounting an optical-electrical integrated circuit 2 is set on a substrate setting board 8. This apparatus 10 is provided with a camera 11 to obtain a video signal by taking a picture of the part where an optical transmission line is to be formed and a capillary (an example of nozzle in the present invention) 12 for injecting the optical transmission line forming material in the fluid condition. At the upper part of the capillary 12, an optical transmission line forming material transfer means to supply the optical transmission line forming material to the capillary 12 is usually provided but it is omitted in FIG. 2.

Moreover, although not illustrated in FIG. 2, a nozzle (refer to nozzle 30 of FIG. 3) for blowing with cold or hot air or a light source for irradiation of the light is provided at the side of the capillary 12 in some embodiments described later.

The capillary 12 is coupled with a capillary driving means 114 for freely moving, through an arm 13, the capillary 12 in the three dimensional directions of X direction to horizontally rotate the arm 13, Y direction to extend and compress the arm 13 and Z direction to vertically rotate the arm 13. When it is required to move the substrate 1 to a large extent, the substrate board 8 is moved. A video signal obtained from a camera 11 is inputted to a control circuit 115 composed, for example, of a microcomputer, etc. This control circuit 115 automatically recognizes the position of the point (optical transmission terminal) to be connected on the optical transmission line with the video signal and controls the capillary driving means 114 to move the capillary 12 to the position depending on the optical transmission terminal. Further, this control circuit 115 also controls rotation of a ball type screw (refer to FIG. 4), described later, used to suspendably inject the optical transmission line forming material from the capillary 12. Details of movement control of capillary 12 and supply control of optical transmission line forming material through the capillary driving means 114 by the control circuit 115 will be explained later.

Figure 3:
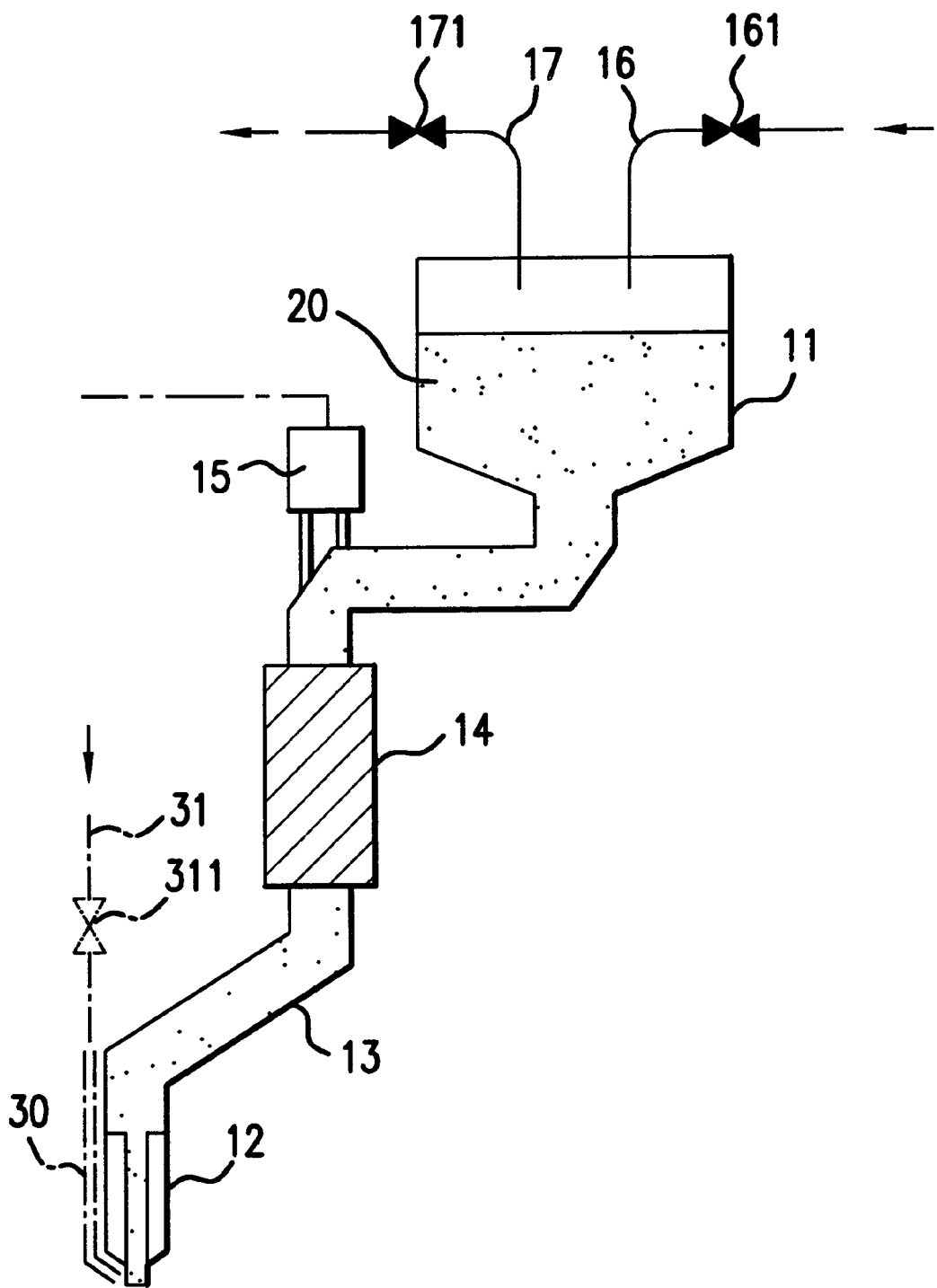
FIG. 3 is a schematic structural diagram of an optical transmission line forming material transferring means provided at the upper part of a capillary.

FIG. 3 is a schematic structural diagram of an optical transmission line forming material transferring means provided at the upper part of the capillary which has been omitted in FIG. 2.

At the upper part of the capillary 12, a tank 11 is provided and is coupled with the capillary 12 through a transferring pipe 13 to transfer the optical transmission line forming material 20. Moreover, in the course of the transfer pipe 13, a transfer control means 14 is provided to control amount of the optical transmission line forming material 20 to be transferred to the capillary 12.

Figure 4:
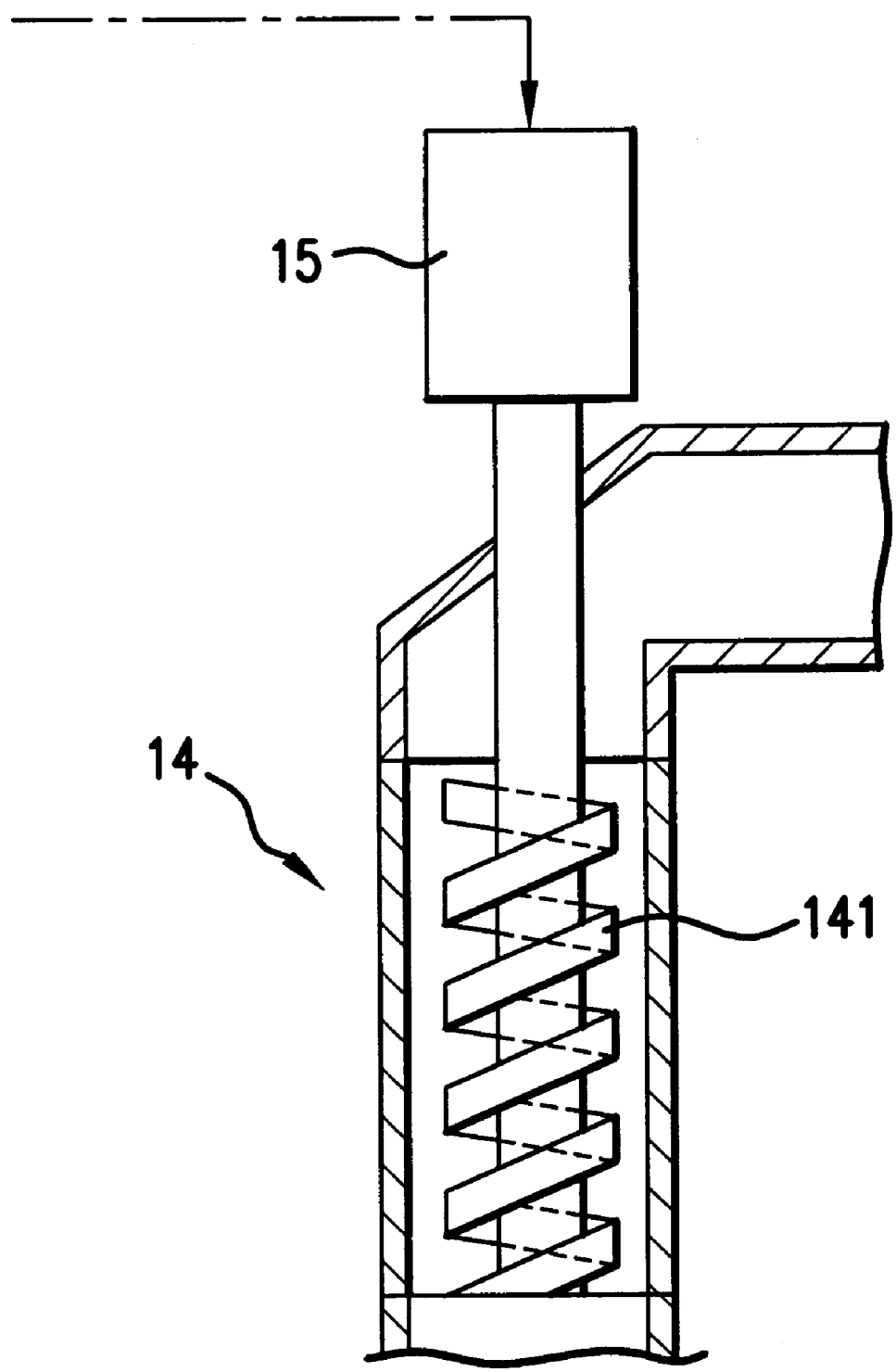
FIG. 4 is a schematic cross-sectional view of a transfer control means.

FIG. 4 is a schematic cross-sectional view of the transfer amount control means.

At the inside of the transfer amount control means 14, a ball type screw 141 is provided and is coupled with a motor 15 through a rotating shaft of the screw 141. This motor 15 is controlled for start and stop of rotation with a command from the control circuit 115 shown in FIG. 2 and transfer amount of the optical transmission line forming material 20 to the capillary 12 by this transfer amount control means 14 is determined depending on rotation of this motor 15.

Returning to FIG. 3, explanation will be continued.

The upper part of the tank 11 is sealed to be opened and closed. At the upper part of the tank 11, a pressurizing pipe 16 for sending the air or the predetermined gas to pressurize the inside of tank 11 and a valve 161 for controlling on and off the pressurizing pipe 16 are also provided. In the same manner, a vacuum pipe 17 for reducing the inside pressure of the tank 11 and a valve 171 for this pipe are also provided at the upper part of the tank 11.

Depending on the embodiments described later, a nozzle 30 for blowing cooling gas or hot air conforming to the embodiment is provided at the side of the capillary 12 and the nozzle 30 is then provided with a pipe 31 for supplying such gas and hot air and a valve 311 for the pipe.

An optical transmission line forming material, first connecting process, optical transmission line bridging process and second connecting process which are important elements of the present invention will be explained and then embodiments thereof will also be explained.

(Optical transmission line forming material)

For selection of an optical transmission line forming material (hereinafter, referred only to as material), a melting point or glass transition point are also important points as well as transparency and refraction index.

For the optical transmission terminal connected by the optical transmission line forming material, such as LED, light receiving element or optical waveguide, etc. where temperature rise during operation is not distinctive, the material showing a comparatively lower melting point can be used. For example, PMMA (glass transition point is 110° C. and refraction index is 1.49) is used as a material of the plastic optical fiber, showing higher reliability as the optical waveguide.

However, when the optical transmission line forming material is connected to a light emitting element such as LD, temperature rise generated by driving the light emitting element must be considered. In the case of LD such as surface light emitting laser, the surface temperature sometimes rises up to about 150° C. and a low melting point material such as PMMA shows a low reliability because there is probability that the optical transmission line formed is thermally deformed and displacement or disconnection between the optical transmission line and optical transmission terminal is generated at the connecting point.

Therefore, when a fusible material is used, a high melting point material must be selected, considering temperature rise of the connecting point. Moreover, if an excessively high melting point material is used, on the contrary, an optical waveguide and a circuit in the connected side may probably be broken at the time of forming the optical transmission line.

In addition, if viscosity of a material used to form an optical transmission line is too high, the material is solidified leaving ununiformity in supply of material or whisker in the optical transmission line itself and at the optical transmission terminal and thereby optical transmission performance is lowered due to generation of inverse propagation or scattering of the light beam. When viscosity is low, on the contrary, the optical transmission line forming rate must be lowered, and the surface becomes smooth due to the surface tension of the material itself, improving the optical transmission characteristic.

Namely, a fusible material must be selected on the basis of the maximum temperature rise at the optical transmission terminal, temperature and viscosity of the material during the bonding process.

Here, when an optical transmission line is formed with a thermosetting material which is never fused, it is not particularly required to consider temperature rise of the connection object but a material having a higher heat resistivity must be used considering possibility of thermal decomposition.

In the first embodiment to be described later, polyarylate is selected from high melting point materials, considering temperature rise at the light emitting means. As polyarylate, the Upolymer (bland name), for example, of Unitika Ltd. is available as the material. The material characteristics are as follows: transmissivity is 90%; refraction index is 1.60; glass transition point is 193° C.; thermal deformation temperature is 175° C. Viscosity changes depending on the melting temperature. Viscosity is $10^2$ to $10^5$ poise at 270 to 350° C. Moreover, as the other high melting point materials, polysulfon, polyethersulfon (glass transition point: 224° C.) may be listed.

Here, considering congeniality between the optical transmission line forming material and optical transmission line terminal connected thereto, there is no problem when the melted optical transmission line forming material can be connected to the optical transmission line terminal without any processing, but if such congeniality is poor, a primer material may also be used. As the primer material, the primer A formed of Toray-Dow Corning Silicone may be used.

However, in this case, since a process to supply the primer material to the optical transmission terminal is necessary, it is preferable to heat up the substrate to be connected and improve adhesivity by setting the atmospheric temperature at the connecting point to a higher value, in place of using the primer material. Moreover, it is preferable also for the optical transmission line forming material to select a material having good adhesivity to a passivation film, for example, phosphor silicate glass and low melting point glass of the optical circuit to be connected with such material.

Therefore, in the first embodiment explained hereunder, the bonding work is carried out in the atmosphere of 170 to 220° C.

(First connecting process)

In the first connecting process and the second connecting process to be explained later, the light incoming/outgoing performance at the optical transmission terminal is very important.

Namely, connection must be performed so that not only the matching characteristic at the connecting point between the optical transmission line forming material and the optical waveguide guide, light emitting element or light receiving element as the optical transmission terminal is maintained but also optical transmission characteristic is never lowered by scattering or refraction of input or output light at the connecting point.

Regarding the positioning of the junction area, it can be performed by providing the positioning mark to a circuit substrate and moving the capillary 12 to the previously stored junction area as is performed in the wire bonding method of the related art.

Moreover, when the optical transmission line forming material is connected to the optical transmission terminal, it must not be cooled excessively in order to enhance the coupling performance at the connecting point. If it is cooled excessively, only the end part of the optical transmission line forming material is solidified, forming bubbles at the connecting point to probably scatter the incoming and outgoing lights.

Therefore, it is preferable that the optical transmission terminal is previously heated. The substrate setting board 8 of the apparatus 10 shown in FIG. 2 is heated by a heater or the atmosphere around the connecting area is heated so that the optical transmission terminal is heated. When the atmosphere around the connecting area is heated, the substrate 1 as a whole is heated uniformly. Therefore, damage on the optical circuit to be connected is reduced and moreover clogging of material at the capillary 12 can be prevented because the optical transmission line forming material supplied from the capillary 12 is not cooled quickly. Accordingly, This method is also effective in the point that solidification of the optical transmission line forming material at the end part of the capillary 12 can be prevented during the movement of the capillary 12 before the first connecting process starts.

When the atmosphere is not heated, solidification of the end part of capillary can be prevented by increasing temperature of the capillary 12 itself, but since temperature of the material itself rises as much as temperature rise of the capillary 12, solidification is delayed and moreover solidification rate perhaps changes largely at the surface exposed to the atmospheric condition and inside thereof. Therefore sufficient attention must be paid not to allow generation of unexpected fluctuation in distribution of refraction index and other optical transmission characteristics.

(Optical transmission line bridging process)

In the optical transmission line bridging process, since the end part of the optical fiber having the guaranteed optical transmission characteristic is not aligned with the optical transmission line terminal but the optical transmission line is formed with the optical transmission line forming material before it is solidified, the optical transmission line formed by solidification must actually provide the function as the optical transmission line. Namely, the optical transmission line must be formed to assure that the incident light to the optical transmission line from the optical transmission line terminal is accurately propagated to the other optical transmission line terminal while it is repeating reflection within the optical transmission line. Therefore, the shape of the optical transmission line must also be determined not to allow deterioration of optical transmission characteristic due to generation of inverse propagation, scattering and transparency.

Therefore, in such a case that the first optical transmission line terminal is a part of the optical transmission line in the side for applying the light to the optical transmission line such as a light emitting means and the optical transmission line is formed from this light emitting means side, the capillary 12 is moved to form the optical transmission line along the light propagating direction at the first optical transmission line terminal. Thereby, the incident light to the optical transmission line is surely guided to the optical transmission line.

Next, the optical transmission line is formed toward the second optical transmission line terminal. In this case, a curvature of optical transmission line must be adjusted depending on the shape of the second optical transmission line terminal and the connection object.

For example, when the second optical transmission terminal is a light receiving element having a wide directivity in the light detecting direction, the capillary is required to move in such a manner that the optical transmission line has a shape determined by the known waveguide designing method.

However, when the optical transmission line is connected to the light receiving element having directivity for incident light and the waveguide previously formed on the substrate, the optical transmission line must be formed so that the outgoing direction of the outgoing light from the optical transmission line is matched with the incident direction of the waveguide or the like.

In above example, the light is incident to the optical transmission line from the first optical transmission terminal side for making easier the understanding, but, on the contrary, when the first optical transmission terminal is located in the receiving side, the optical transmission line forming direction can be determined on the same design concept. Moreover, when one optical transmission terminal is used by the incident light and outgoing light, it must be formed to satisfy the conditions for both lights.

Since accuracy of direction for outgoing light from an optical circuit or a light emitting element which is the connection object of the optical transmission line forming material has comparatively less fluctuation, the light can surely be applied into the optical transmission line by forming the optical transmission line along the outgoing direction. Therefore, the connecting position alignment accuracy of the incident side of optical transmission line may be lower than that in the light outgoing side. On the other hand, since the outgoing side often depends, as explained above, largely on the shape of the optical transmission line in its light outgoing direction, the outgoing side requires higher accuracy of formation of the optical transmission line.

When optical connection is made while an optical transmission line is formed, connection at the first optical transmission terminal can be controlled easily but connection control at the second optical transmission terminal is difficult because connection is made at the side surface of the optical transmission line forming material injected from the capillary. Therefore, when the light incident side and outgoing side are previously determined, connection control will become easier if the outgoing side (incident side of the optical transmission line) is defined as the first optical transmission terminal and the incident side (outgoing side of the optical transmission line) is defined as the second optical transmission terminal.

(Second connecting process)

In the second connecting process, matching between the incident and outgoing direction of the optical transmission terminal and shape of the formed optical transmission line is also necessary.

For the connection of the optical transmission line and the second optical transmission terminal during formation of the optical transmission line, the side surface side of the optical transmission line must be pressed to the connecting point.

Therefore, for the successful propagation of the light to the second optical transmission terminal from the optical transmission line, it is required, at the second optical transmission terminal, to control movement of the capillary so that the surface in the optical transmission line side becomes the cross-section side of the optical waveguide (namely, the light passing surface) or to form the optical transmission line so that the cutting surface of the optical transmission line forming material functions as the reflecting surface in the light incident and out going directions. The reflecting surface formed by the method where the side surface of the capillary is pressed may also be formed by additionally providing the other process.

Various embodiments based on the basic concept explained above will then be explained.

First Embodiment

Figure 5A:
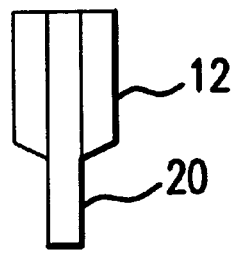
FIGS. 5A–C illustrate the former section of the process to form an optical transmission line in the first embodiment of the optical transmission line forming method of the present invention.
Figure 5B:
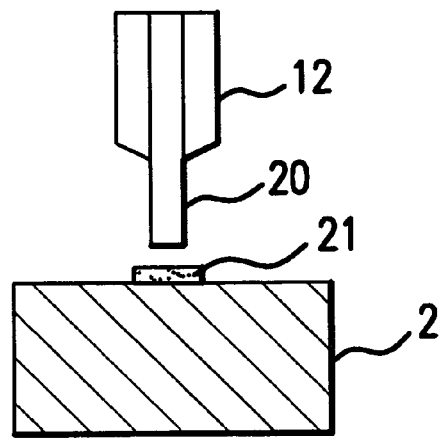
Figure 5C:
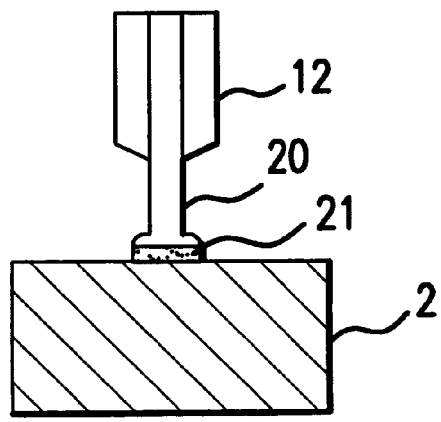
Figure 6A:
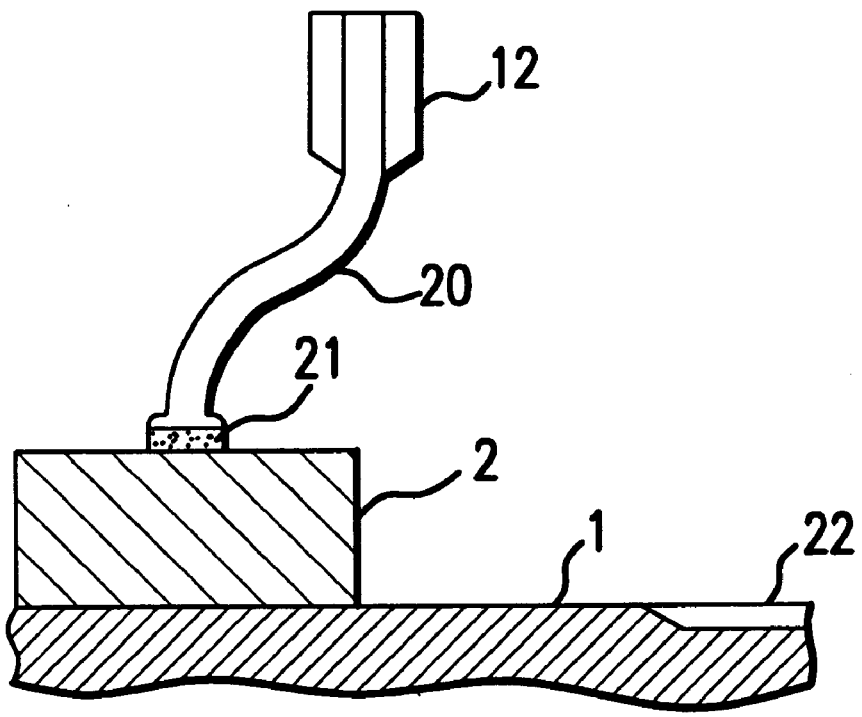
FIGS. 6A and B illustrate the intermediate section of the process to form an optical transmission line in the first embodiment of the optical transmission line in the first embodiment of the optical transmission line forming method of the present invention.
Figure 7A:
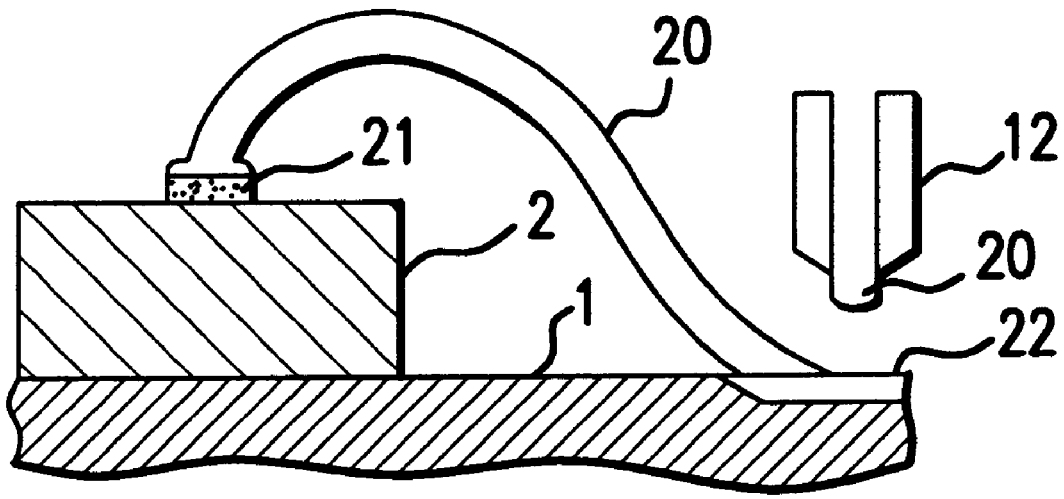
FIGS. 7A and B illustrate the latter section of the process to form an optical transmission line in the first embodiment of the optical transmission line forming method of the present invention.

FIGS. 5A–C, to FIGS. 6A and B, and FIGS. 7A and B show the former stage, intermediate stage and latter stage, respectively, of the process to form an optical transmission line in the first embodiment of the optical transmission line forming method of the present invention.

The first embodiment of the present invention will be explained with reference to FIGS. 1–7B.

First, polyarylate as the optical transmission line forming material 20 is put into a temperature control tank 11 with heater shown in FIG. 3 and it is heated, for example, up to 300° C. so that polyarylate is sufficiently melted to have predetermined viscosity. Thereafter, a valve 171 is opened to remove the air included in the optical transmission line forming material 20.

Next, after the valve 171 is closed, the valve 161 is in turn opened to pressurize the inside of tank 11. Moreover, the motor 15 is rotated to rotate a screw 141 (refer to FIG. 4) provided in the transfer amount control means 14 in such a side as supplying the optical transmission line forming material 20 to the capillary 121. Thereby, the optical transmission line forming material 20 in the fluid condition is extruded toward the capillary 12 from the tank 11.

The diameter of end part of capillary 12 is designed a little thicker than the desired diameter of optical transmission line. For instance, when the size of the light emitting part of the light emitting element to be connected is 10 $\mu$m in diameter, the optical transmission line having the diameter of about 25 $\mu$m is formed and the end point diameter of capillary 12 is designed to about 40 $\mu$m in diameter for such optical transmission line.

First, the capillary 12 is moved to the position just above the light emitting element as the first optical transmission terminal 21 and supplies, at this position, the optical transmission line forming material 20 heated up to 270° C., to 300° C. (FIG. 5A). Under the condition that the optical transmission line forming material 20 is partly extruded from the capillary 12, the capillary 12 is moved downward (FIG. 5). When the leading end of the optical transmission line forming material 20 is pushed toward the first optical transmission terminal 21, a part of the leading end of the material 20 spreads to the periphery and the end part of material 20 cooled through contact with the first optical transmission terminal 21 to be solidified and to have abonding force. Since when the bonding area becomes large, a bonding force also increases, the pushing time by the first optical transmission terminal 21 is actually set a little longer, like the first bonding process where a ball is crushed by the wire bonder for gold wire of the related art to provide a larger bonding area, and thereby a larger amount of material at the first optical transmission terminal 21 is supplied to make large the bonding area to enhance the bonding strength. However, if excessive amount of material is supplied, the incident light to the optical transmission line is scattered or reflected at the overflowing area, lowering the optical coupling characteristic. Therefore, any consideration for supply of material is not required when the optical transmission line is sufficiently larger than the light emitting area of the light emitting element forming the first optical transmission terminal 21, but the optical transmission line diameter is similar to or smaller than the light emitting area, the material should preferably be supplied so that the overflow width of material is controlled to 20% or less of the optical transmission line.

Thereafter, while the optical transmission line forming material 20 is extruded by pressurizing the material 20, the capillary 12 gradually rises to move in such a manner as depicting an arc toward the light receiving element as the second optical transmission terminal 22 (FIG. 6A).

In this embodiment, the light emitting element emits the light in the direction perpendicular to the circuit board, therefore the optical transmission line is formed to extend in the direction perpendicular to the first optical transmission terminal 21, the capillary 12 moves toward the second optical transmission terminal 22 in the gradual curvature with the diameter connecting the two points of the first optical transmission terminal 21 and second optical transmission terminal 22, and thereby the optical transmission line is formed while the outline of optical transmission line is formed and is moreover solidified. Therefore, the positional alignment is required only for the optical transmission terminals 21, 22 and thereby positional alignment cost can remarkably be reduced. The capillary 12 is heated up to the end part and the optical transmission line forming material 20 is melted at the end part of the capillary 12. For the control of shape of the optical transmission line, viscosity of the optical transmission line forming material 20 is desirably adjusted to about $10^2$ to $10^5$ pores.

In the connecting process to the first optical transmission terminal 21 explained above, the optical transmission line forming material 20, upon exhaustion from the capillary 12, is placed in contact with the first optical transmission terminal 21 heated up to 150 to 175° C. and is thereby cooled and simultaneously bonded. Thereafter, the optical transmission line forming material 20 is injected from the capillary 12 in accordance with the moving speed of the capillary 12 and is simultaneously solidified (to have a higher viscosity) by the atmospheric air (175° C. or lower) to form the optical transmission line in such a shape as conforming to the moving locus of the capillary 12.

Therefore, the loop control (shape control) similar to the loop control introduced in the wire bonder of the related art using a gold wire can also be introduced by inputting the coordinates of the two points to be connected into the apparatus 10 shown in FIG. 2. But, the loop control which has been performed by the wire bonder using a gold wire in the related art is intended to control the top of loop to a lower value, but, in this embodiment, control must be performed so that the shape of loop depicts a curve as smooth as possible. Moreover, the wire bonder for gold wire of the related art bends the straight gold wire to the desired shape through the complicated control, however the optical transmission line forming apparatus 10 of this embodiment forms the optical transmission line in such a manner as depicting a semicircle in the diameter equal to the distance connecting two optical transmission terminals when reception and emission of light at the optical transmission terminal is perpendicular to the light receiving and emitting surfaces thereof.

Moreover, for example, when the first optical transmission terminal 21 is a device for emitting the light to the upper side (perpendicular direction for the circuit board) from the upper surface of the circuit board and the second optical transmission terminal 22 is a thin film waveguide which is formed on the circuit board extending along the surface thereof, the light is propagated in the horizontal direction in the side of the second optical transmission terminal 22. Therefore, it is enough to control the moving locus of the capillary 12 in such a manner that the optical transmission line depicts a semicircle projected upward with the diameter equal to a half of the distance connecting two points at the area from the upper surface to the upper area of the first optical transmission terminal 21 and also depicts a semicircle projected downward from the intermediate area and also depicts a curve smoothly connecting the arc explained above wherein the second optical transmission terminal 22 is placed in contact with the arc, that is, the thin film waveguide formed on the circuit board becomes a tangent.

Meanwhile, in the case of the device which emits the light in the side direction with respect to the first optical transmission terminal 21 like an end face light emitting type laser diode, the capillary 12 itself is rotated for 90° for the connection between the first optical transmission terminal 21 and the optical transmission line forming material 20. Thereafter, for example, when the second optical transmission terminal is a thin film waveguide on the circuit substrate, it can be formed so that the capillary 12 is rotated for 90° to return to the initial position to move toward the second optical transmission terminal 22, the transmission line is projected downward and the second optical transmission terminal 22 is placed in contact with the arc, that is, the waveguide on the circuit substrate becomes a tangent and is smoothly in contact with the line extending horizontally from the first optical transmission terminal 21. Of course, it is also possible that the circuit substrate side is erected in vertical, the capillary 12 is kept vertically for the connection at the first optical transmission terminal 21 and the capillary is rotated for 90 degrees toward the connection in the circuit substrate side. As explained, any type of optical transmission terminals 21, 22 can be connected by controlling the shape of the optical transmission line with the moving locus of the capillary 12.

Figure 6B:
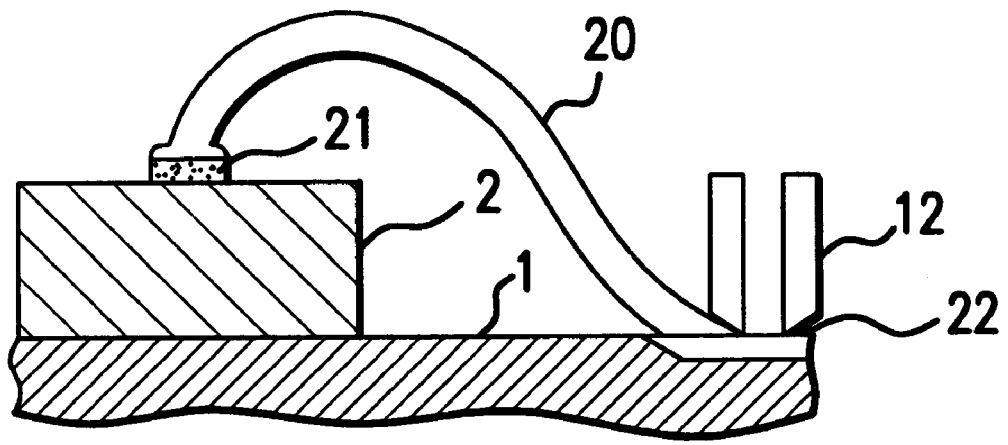

The capillary 12 moves up to the position of the second optical transmission terminal 22 in the side of substrate 1, while depicting the locus as explained above, placing the end point thereof in contact with the second optical transmission terminal 22 (FIG. 6B).

Figure 7B:
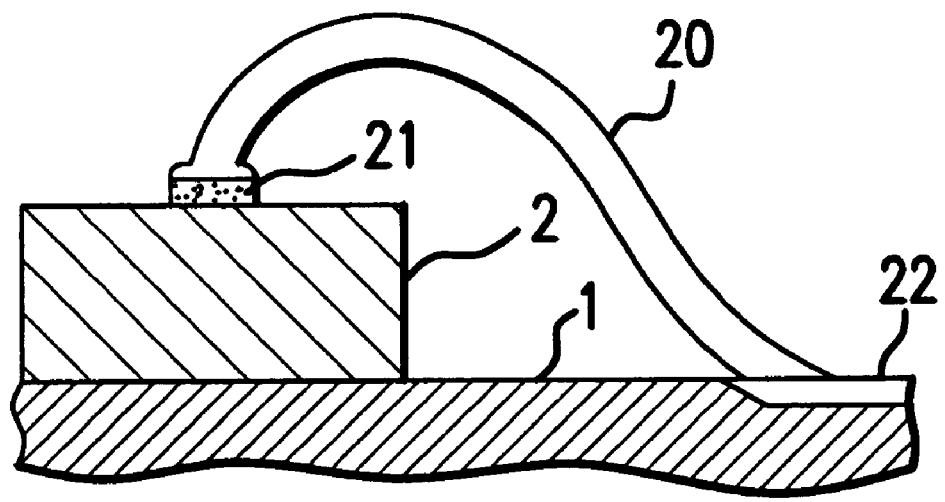

In this timing, the pressurized control to the optical transmission line forming material 20 is suspended and the screw 141 is inversely rotated for a moment. Immediately after that, the capillary 12 is caused to rise to cut the optical transmission line forming material 20 at the second optical transmission terminal 22 during the pulling of the optical transmission line forming material 20 (FIG. 7A) and thereby the optical transmission line is formed between the first optical transmission terminal 21 and the second optical transmission terminal 22 (FIG. 7B).

Figure 8:
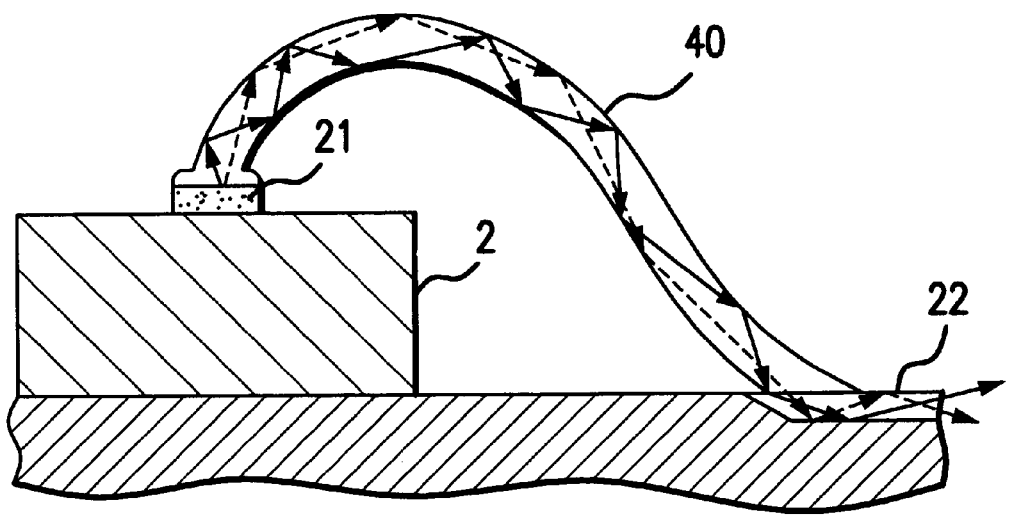
FIG. 8 is a schematic diagram illustrating an optical transmission line formed and a profile of the light propagating in the optical transmission line.

When a time difference is only provided between the processes that supply of the optical transmission line forming material 20 is stopped and the capillary 12 is caused to rise, after the capillary 12 is placed in contact with the second optical transmission terminal 22, a part of the material like whisker probably be left at the end part of the optical transmission line in the side of the second optical transmission terminal 22. If such a material is left, the light which has been propagated in the optical transmission line may be reflected there, resulting in poor optical coupling characteristic between the transmission line and the second optical transmission terminal 22. Therefore, in this embodiment, the end part of the capillary 12 is formed to have the tapered area for the surface of the wiring substrate 1 and thereby control the shape of the connecting area of the second optical transmission terminal 22 of the optical transmission line in view of giving the function to bend the optical path in the direction of the substrate 1 as shown in FIG. 8. The shape of the optical transmission line can be controlled, as explained above, by changing the shape of end part of the capillary 12 depending on the specifications of the second optical transmission terminal 22. For example, the second optical transmission terminal 22 is a light receiving element, it would be better to give the area tapered by the angle of almost 45 degrees thereto so that the light having propagated in the optical transmission line is guided in vertical to the second optical transmission terminal 22 and moreover connection characteristic to the waveguide on the wiring substrate can be enhanced by setting the tapering angle to 10 to 30 degrees for the connection to the waveguide extending in the horizontal direction.

After completion of a series of optical transmission line forming process or prior to a series of optical transmission line forming process, each electrical connecting terminal is electrically connected by the wire bonding method using a gold wire as described in the related art.

As explained, after both electrical connection and optical connection are completed, the substrate 1 is removed from the substrate board 8 and is then cooled. Thereby, the polyarylate as the optical transmission line forming material is solidified and an optical transmission line 40 in the shape as shown in FIG. 8 can be completed.

In above first embodiment, polyarylate has been used as the optical transmission line forming material 20, but any type of material having optical transparency can be selected from polymethylmethacrylate, polycarbonate, polyethersulfon, amorphousorefin or the like and moreover an inorganic material such as glass can also be applied in addition to organic polymer materials.

Second Embodiment

For each embodiment from the second embodiment, the contents similar to that of the first embodiment will be omitted from the explanation.

Similar to the first embodiment, reference is made to to FIGS. 1–8, for the second embodiment. Difference from the first embodiment is as follow and other contents are same as that in the first embodiment explained above.

In this second embodiment, as the optical transmission line forming material 20, a silicone resin having high viscosity (for example, JCR6126 produced by Toray-Dow Corning Silicone) is used.

The optical transmission line formed of this silicone resin is solidified when it is heated and dried up.

Third Embodiment

Figure 9A:
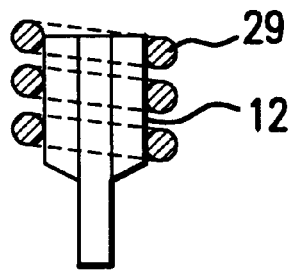
FIGS. 9A–C illustrate the former section of the process to form an optical transmission line in the third embodiment of the optical transmission line forming method of the present invention.
Figure 9B:
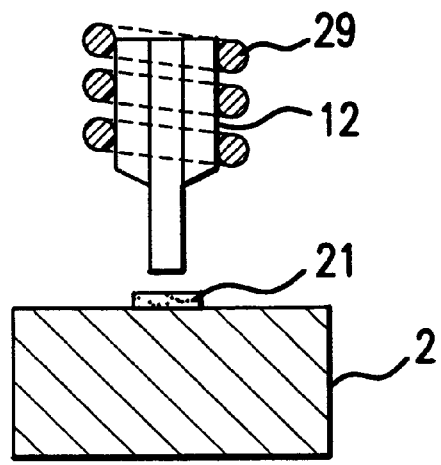
Figure 9C:
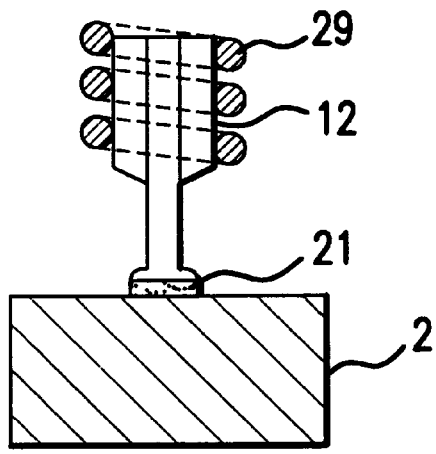
Figure 10A:
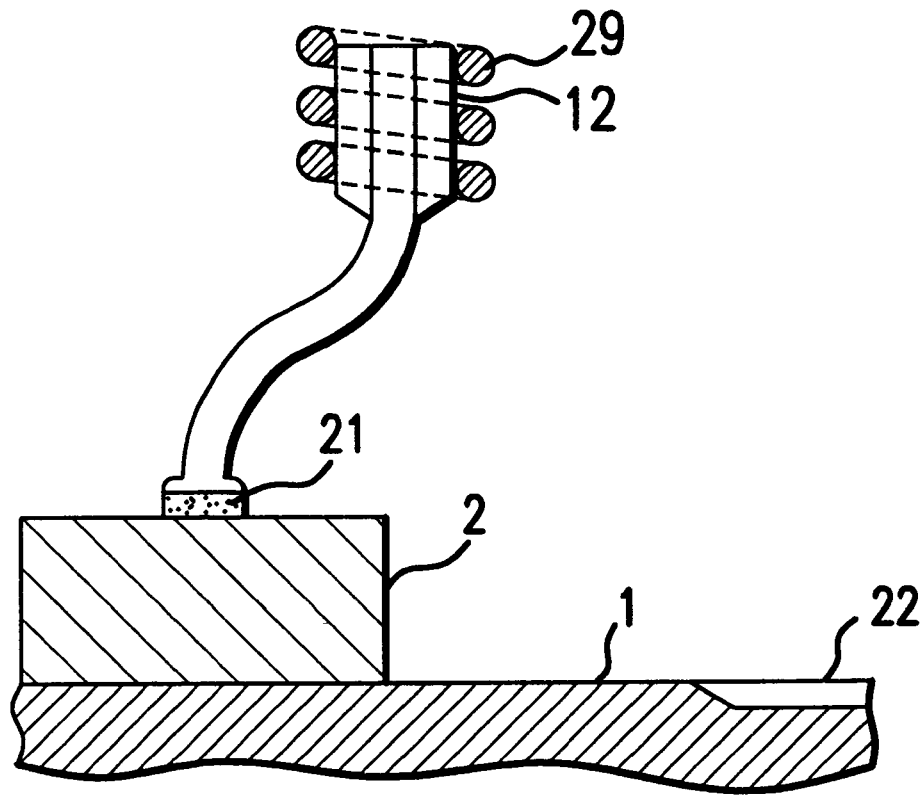
FIGS. 10A–10B illustrate the intermediate section of the process to form an optical transmission line in the third embodiment of the optical transmission line forming method of the present invention.
Figure 10B:
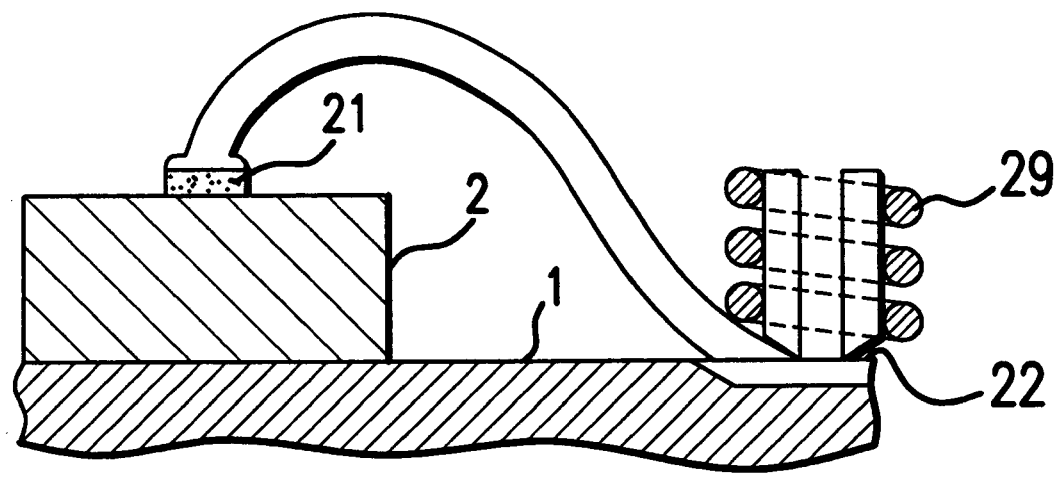
Figure 11A:
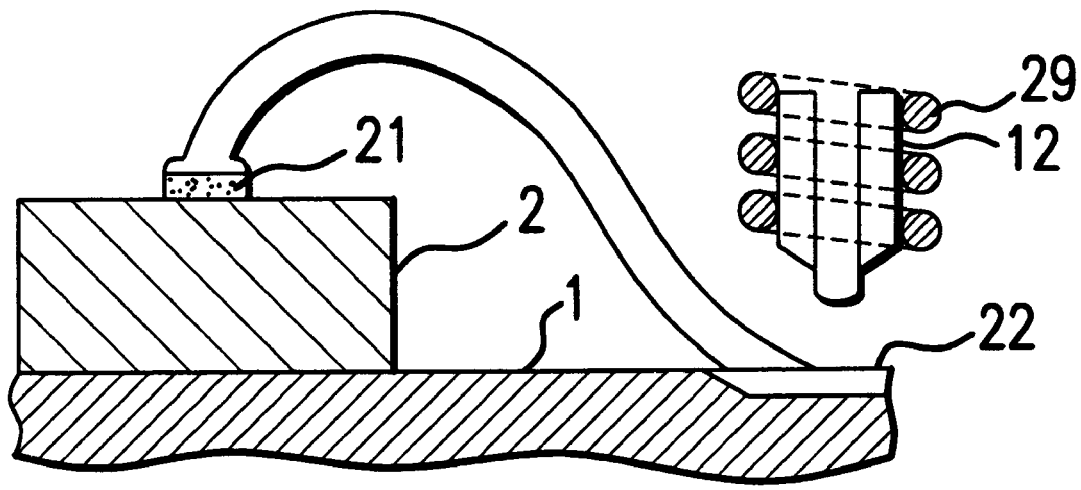
FIGS. 11A and B illustrate the latter section of the process to form an optical transmission line in the third embodiment of the optical transmission line forming method of the present invention.

FIGS. 9A–C, FIGS. 10A and B, and FIGS. 11A and B show the former stage, intermediate stage and latter stage, respectively, of the process to form the optical transmission line in the third embodiment of the optical transmission forming method of the present invention.

Referring to FIGS. 1–4 and FIGS. 9A–11B, the third embodiment of the present invention will be explained.

First, polyarylate is put, as the optical transmission line forming material 20, into a melting tank 11 with heater of the temperature controller. Polyarylate is heated to the temperature, for example, 300° C. so that it is sufficiently melted to have the predetermined viscosity. While polyarylate in the melting tank 11 is melted to the fluid condition with viscosity lowered, the valve 171 is opened to remove the air included in the raw material. Next, polyarylate in the fluid condition is extruded toward the capillary 12 from the melting tank 11 by the pressurizing means including pipe 16, valve 161 and the screw 141. This pushing route is temperature-controlled so that the temperature is gradually lowered toward the capillary 12 from the melting tank 11 and the temperature control heater 29 (refer to FIGS. 9A–11B) is provided at the circumference of the capillary 12. With this temperature drop, the optical transmission line forming material 20 is adjusted to the predetermined high viscosity.

The substrate 1 and optical/electronic integrated circuit 2 mounted on the substrate 1 are fixed on the substrate board 8 temperature-controlled to 150 to 180° C.

Figure 11B:
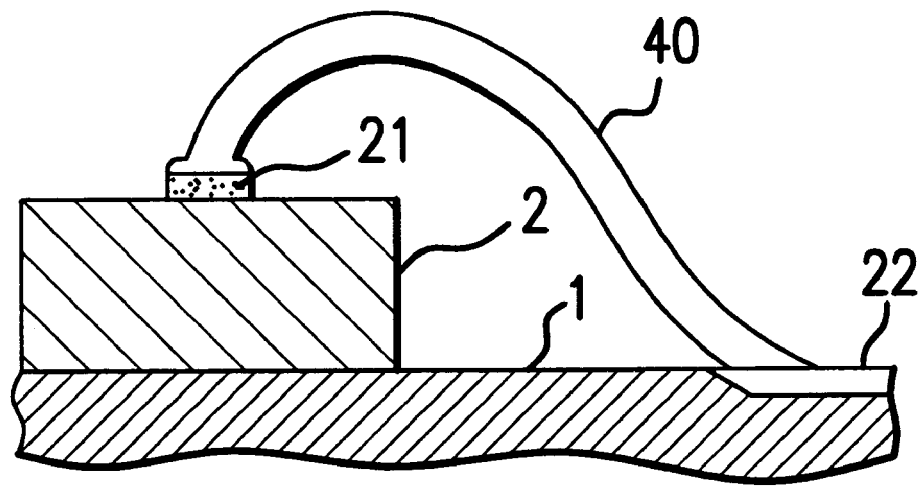

The capillary 12 moves to the upper part of the first optical transmission terminal 21, that is, the light receiving means or light emitting means (FIG. 9A), while it is moving downward to the position just above the first optical transmission terminal 21, the pressurizing control to the optical transmission line forming material 20 in the tank 11 is effectuated, causing the material 20 to be extruded gradually (FIG. 9B), and the end part of the optical transmission line forming material 20 extruded is placed in contact with the first optical transmission terminal 21 (FIG. 9C). Thereafter, the capillary 12 gradually rises while extruding polyarylate by continuously pressurizing polyarylate as the optical transmission line forming material 20 and moves in such a manner to depict an arc toward the second optical transmission terminal 22 (FIG. 10A). When the end point of the capillary 12 is placed in contact with the second optical transmission terminal 22 (FIG. 10A), pressurization control to polyarylate is stopped. Here, the screw 14 rotates momentarily in the inverse direction and the capillary 12 is caused to rise immediately after such inverse rotation. Thereby, during the pulling of the optical transmission line forming material 20, polyarylate is cut at the end part of the second optical transmission terminal 22 (FIG. 11A). Thereafter, the optical transmission line 40 is formed between the first optical transmission terminal 21 and the second optical transmission terminal 22 (FIG. 11B).

After a series of processes to form the optical transmission line 40, or prior to a series of processes, each electrical connecting terminal is connected electrically by the wire bonding method of the related art using a wire netting.

As explained, upon completion of electrical and optical mutual connections, the substrate 1 is removed from the substrate board 8 and is cooled. Thereby, the material, polyarylate, used to form the optical transmission line is solidified.

As a modification of the third embodiment explained above, it is also possible to provide a mechanism for forcibly cooling the optical transmission line forming material by injecting the air or a gas such as nitrogen (for example, consisting of a nozzle 30 shown in FIG. 3) in the vicinity of the end part of the capillary 12. As the coolant, not only a gas but also a liquid may also be used. The shape control for the optical transmission line can be done easily and fluctuation of optical transmission efficiency in the optical transmission line can also be controlled by promoting solidification of the light transparent material.

Fourth Embodiment

The fourth embodiment will be explained with reference to FIG. 1 to FIG. 8.

First, polyester (for example, polyethylene telephtalate) is dissolved, as the optical transmission line forming material 20, into dichromethane as a solvent to adjust the viscosity to the predetermined value. Thereafter, the solution is rendered the removal of air and is then transferred to the solution tank 11.

In the case of this embodiment, since the optical transmission line forming material 20 is transferred to the tank 11 after removal of air element, the vacuum pipe 17 and facility incorporated thereto shown in FIG. 3 are not required to be connected to the tank 11.

Polyester solution as the optical transmission line forming material 20 is extruded toward the capillary 12 from the solution tank 11 with the pressurizing means including the valve 161 and rotation of the screw 141. The capillary 12 moves up to the position just above the first optical transmission terminal 21, that is, the light receiving means or light emitting means. Here, the pressurizing control is effectuated on polyester solution. Thereby polyester solution is gradually extruded and the end part of the polyester solution extruded is placed in contact with the first transmission line terminal 21. Thereafter, the capillary 12 slowly moves upward, while pushing out polyester solution by continuously pressurizing polyester solution and accelerating solidification of polyester extruded from the capillary 12 by blowing a hot wind from the nozzle 30 shown in FIG. 3 and moves in such a manner to depict an arc toward the second optical transmission terminal 22.

When the end point of the capillary 12 is placed in contact with the second optical transmission terminal 22, pressurization control to polyester solution stops. The capillary 12 moves upward again. Simultaneously, with a suck-back mechanism, pulling of the optical transmission line forming material 20 is performed and polyester solution is cut at the second transmission line terminal 22. Thereby, the optical transmission line connecting the first and second optical transmission terminals 21, 22 can be formed.

After a series of processes or prior to such a series of processes, each electrical connecting terminal is connected electrically by the wire bonding method of the related art using a gold wire.

Here, solidification of the optical transmission line forming material 20 is accelerated by blowing a hot wind to the optical transmission line forming material to form an optical transmission line but it is also possible, without restriction to the hot wind, to heat or blow the normal temperature wind thereto depending on a kind of such optical transmission line forming material.

In above embodiment, polyester solution is used as the optical transmission line forming material, but any type of material having the light transparency such as acryl, polyamide (nylon 66, etc.), polystyrene or the like may be used and as the solvent, hexane, benzene, carbon tetrachloride and chloroform or the like may be used in addition to dichloromethane. These materials may also be used solely or in the form of mixing.

As a modification of the fourth embodiment, it is also possible that an optical transmission line forming material which is solidified with polymerization reaction, addition reaction or condensation reaction and such solidification reaction can be accelerated by giving thermal energy or optical energy to the optical transmission line being formed or after formation thereof.

Fifth Embodiment

Figure 12A:
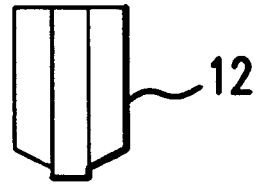
FIGS. 12A–C illustrate the former section of the process to form an optical transmission line in the fifth embodiment of the present invention.
Figure 12B:
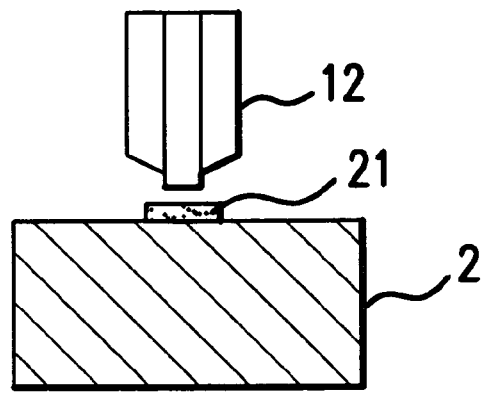
Figure 12C:
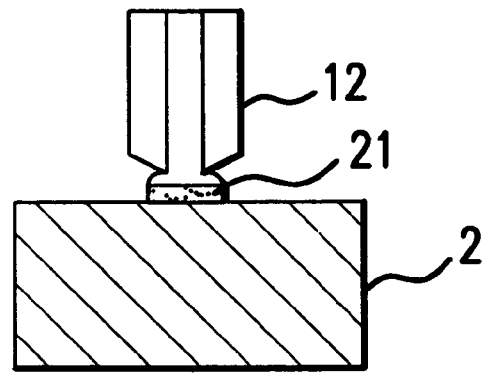
Figure 13A:
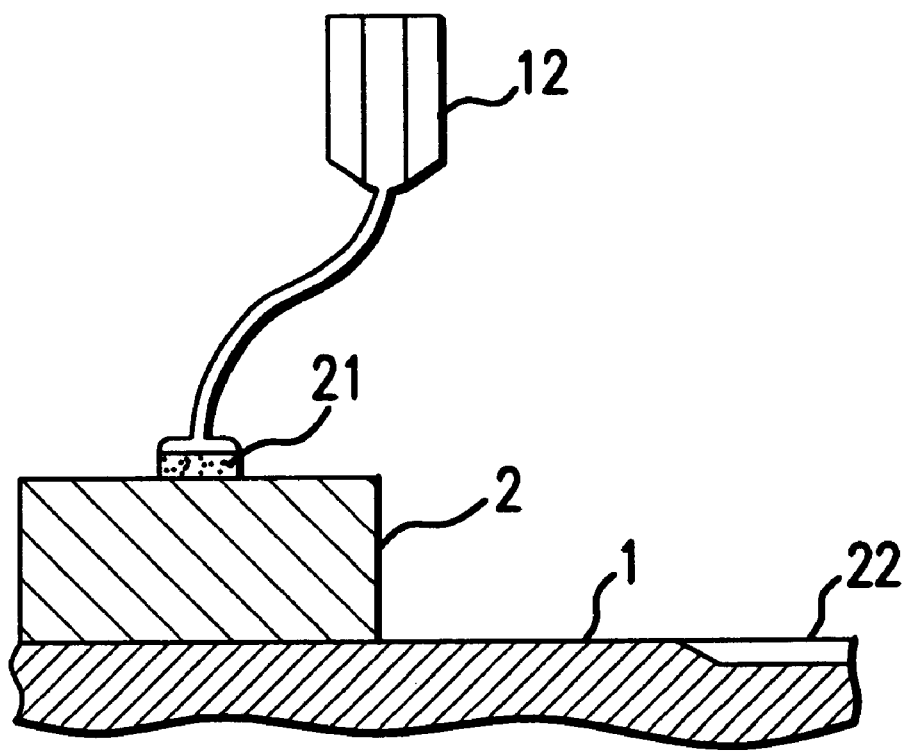
FIGS. 13A and B illustrate the intermediate section of the process to form an optical transmission line in the fifth embodiment of the present invention.
Figure 13B:
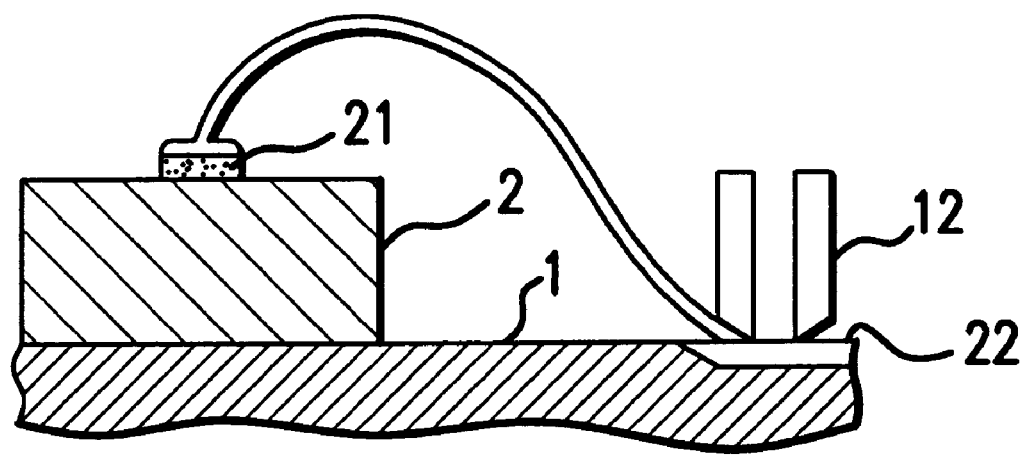
Figure 14A:
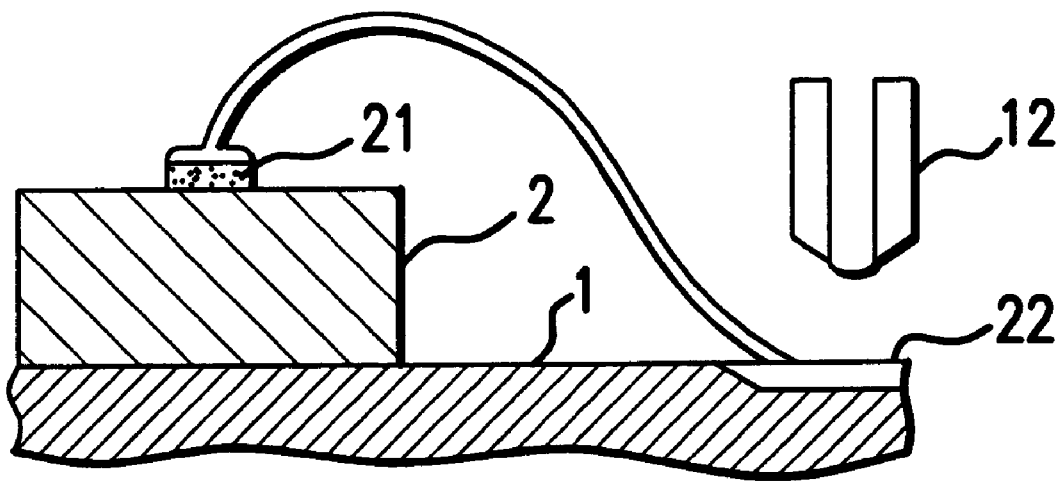
FIGS. 14A and B illustrate the latter section of the process to form an optical transmission line in the fifth embodiment.
Figure 14B:
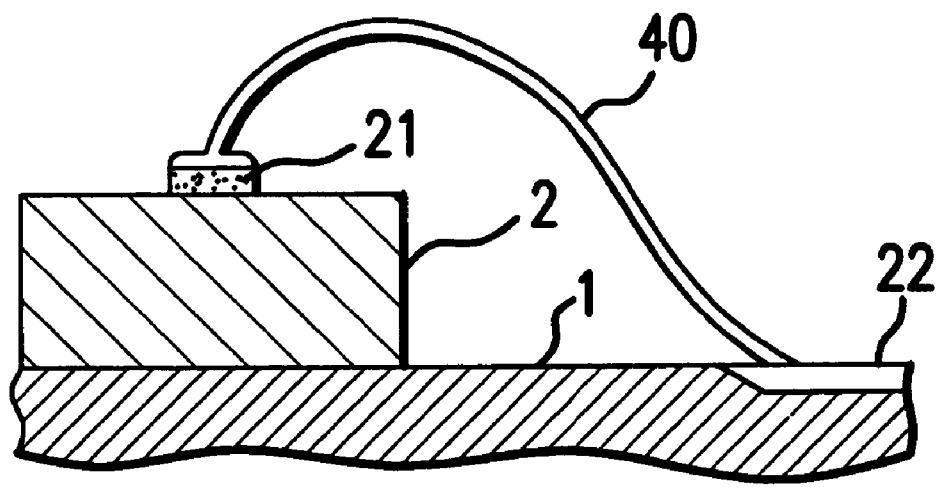

FIGS. 12A–C. FIGS. 13A and B, and FIGS. 14A and B show the former stage, intermediate stage and latter stage, respectively, of the process to form the optical transmission line in the fifth embodiment of the present invention.

The fifth embodiment will be explained with reference to FIGS. 1–4 and FIGS. 12A–14B.

First, polyester as the optical transmission line forming material 20 (for example, polyethylene telephtalate) is dissolved into dichloromethane as the solvent to adjust viscosity to the predetermined value. The solution is rendered removal of air included therein and is then put into the solution tank 11. The polyester solution as the optical transmission line forming material 20 is extruded to the capillary 12 from the solution tank 11 with the pressurizing means including the valve 161 and the screw 141. The capillary 12 moves up to the position just above the first optical transmission terminal 21, that is, the light receiving or light emitting element. Here, the pressurizing control is effectuated on the polyester solution to gradually extrude the polyester solution and the solution is placed in contact with the first optical transmission terminal 21. Thereafter, pressurization of polyester solution is suspended and the capillary 12 moves gradually upward to the second optical transmission terminal 12 in such a manner to depict an arc. During this movement, the polyester solution is not supplied and the capillary 12 is placed in contact with the second optical transmission terminal 22, pulling the polyester solution in contact with the first optical transmission terminal 21, completing the optical connection between the first and second optical transmission terminals 21 and 22.

After or prior to a series of such processes, each electrical connecting terminal is electrically connected by the wire bonding method of the related art using a gold wire.

As explained above, the optical transmission line may be formed utilizing the spinning process.

Moreover, as a modification of this fifth embodiment, it is also possible to realize optical connection by dropping the polyester solution to the first optical transmission terminal 21, thereafter the polyester solution is pulled using a spinning needle or a spinning capillary, as in the case of the fifth embodiment, and is then placed in contact with the second optical transmission terminal 22. The shape of the spinning needle and spinning capillary can be determined freely so long as the pulling is possible.

Sixth Embodiment

Figure 15A:
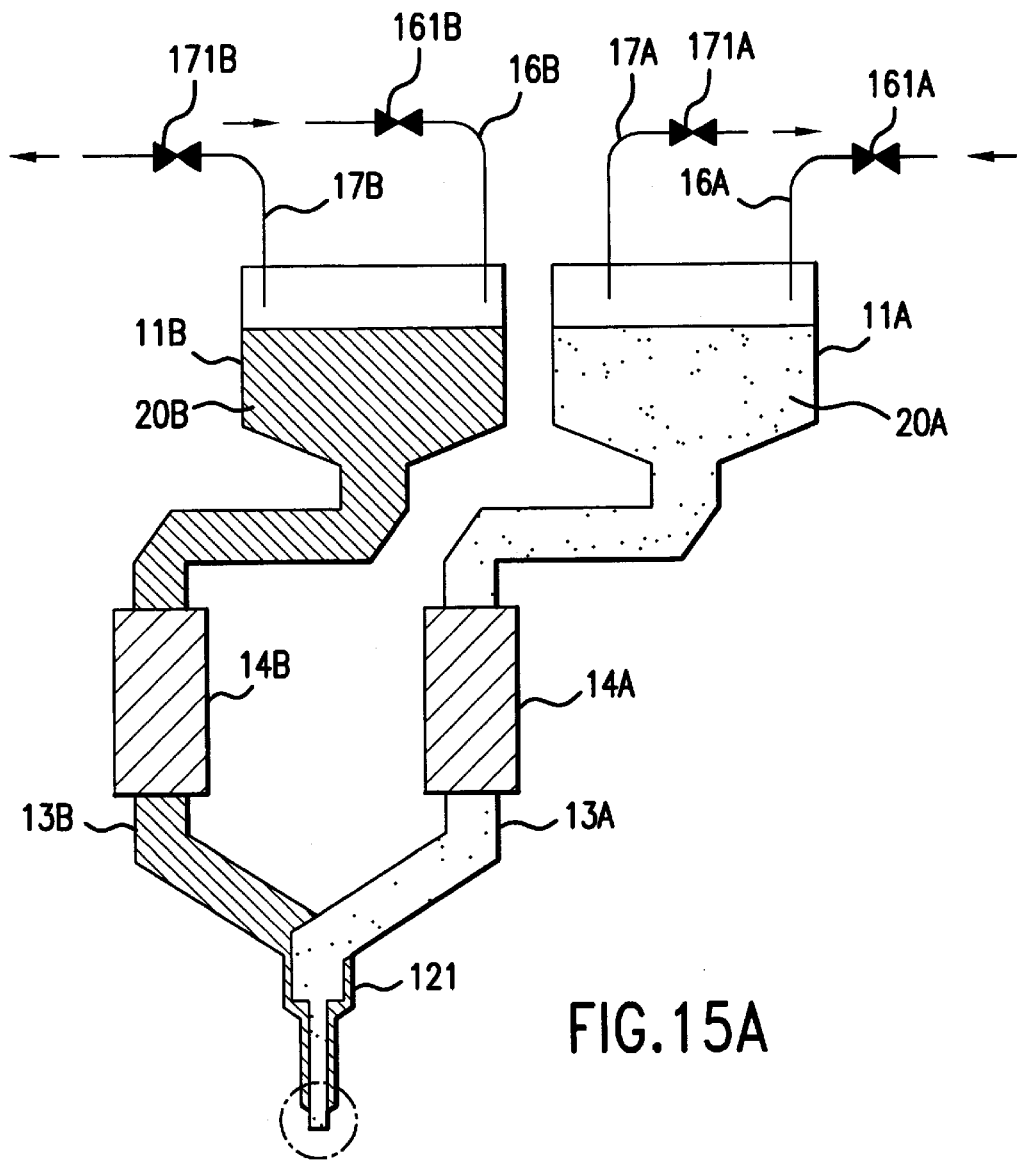
FIGS. 15A and B are schematic structural diagrams of the optical transmission line forming transferring means in the sixth embodiment of the present invention.
Figure 15B:
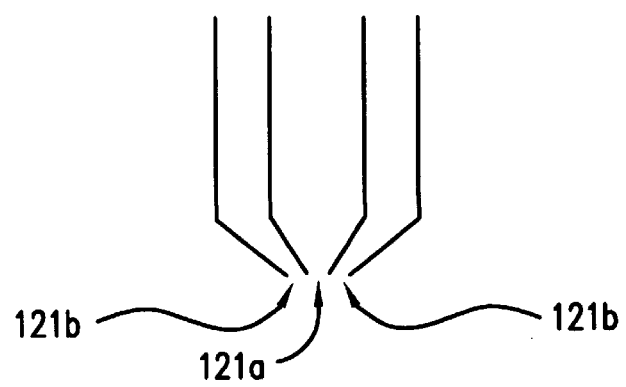
Figure 16A:
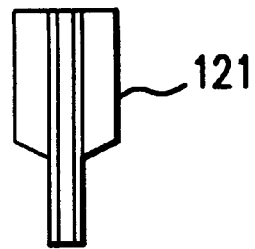
FIGS. 16A–C illustrate the former section of the process to form an optical transmission line in the sixth embodiment of the present invention.
Figure 16B:
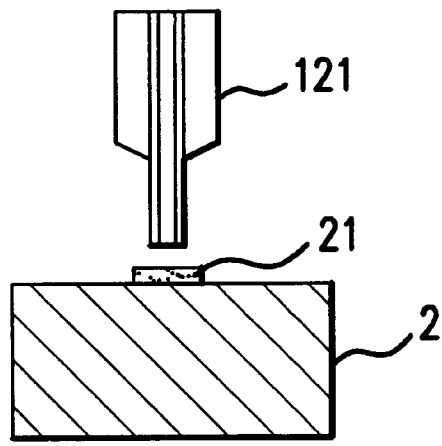
Figure 16C:
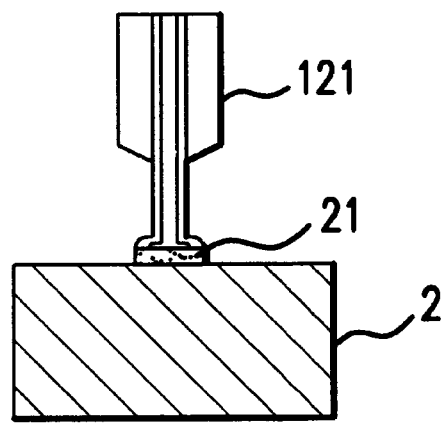
Figure 17A:
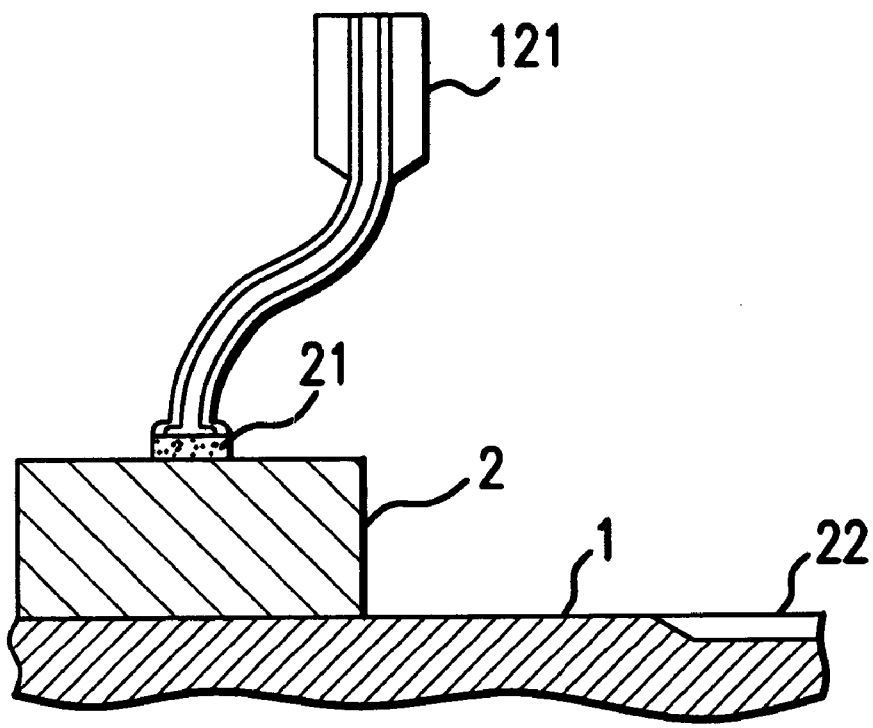
FIGS. 17A and B illustrate the intermediate section of the process to form an optical transmission line in the sixth embodiment of the present invention.
Figure 17B:
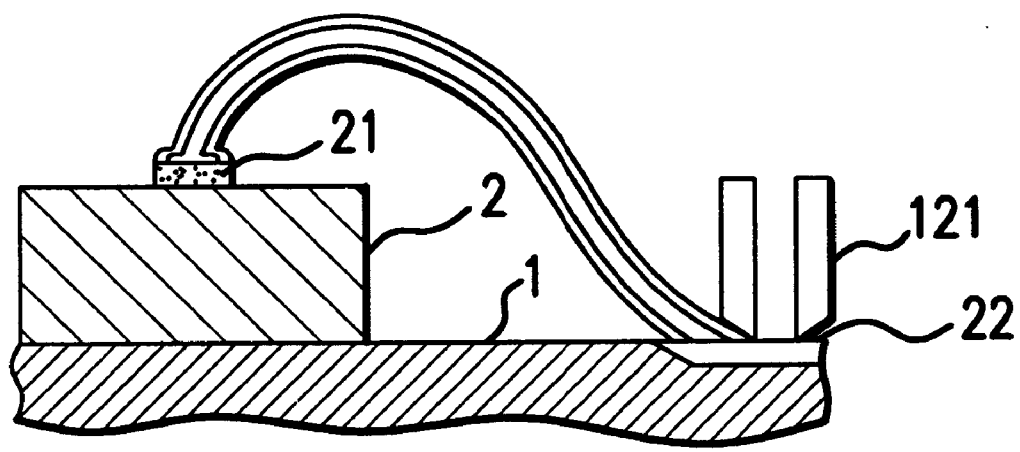

FIG. 15A is a schematic structural diagram of an optical transmission line forming material transfer means used in the sixth embodiment of the present invention. Here, each element incorporated to two tanks 11A, 11B is discriminated by the subscripts A, B as in the case of the tank 11A, 11B.

Main differences from the optical transmission line forming material transfer means shown in FIG. 3 is that the end point of the capillary 121 is formed in the double-tube structure as shown in 15B and the optical transmission line forming material of the double-layer structure of the optical transmission line forming material 20A to form a core from the tank 11A and the optical transmission line forming material 20B to form a clad from the tank 11B is extruded from the end point of the capillary 121.

Figure 18A:
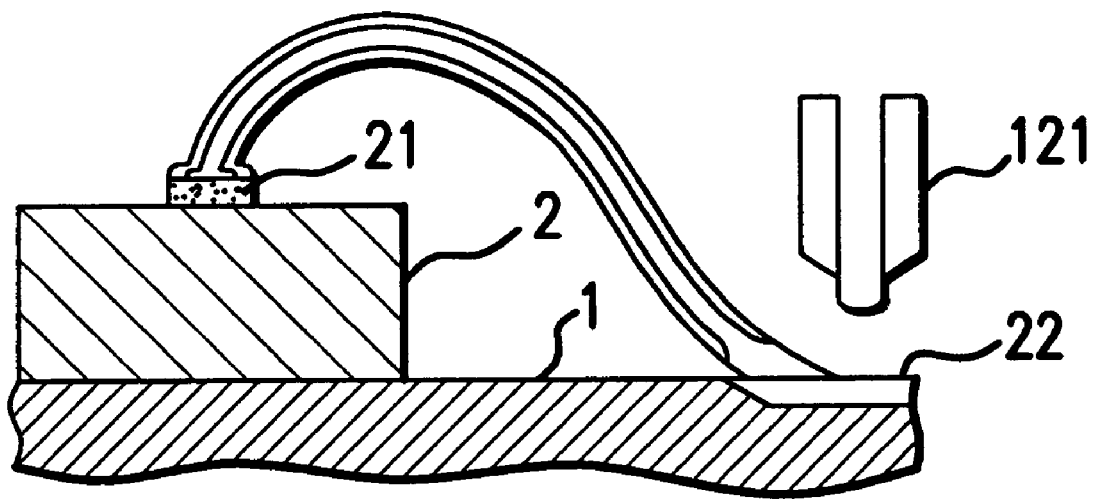
FIGS. 18A and B illustrate the latter section of the process to form an optical transmission line in the sixth embodiment of the present invention.
Figure 18B:
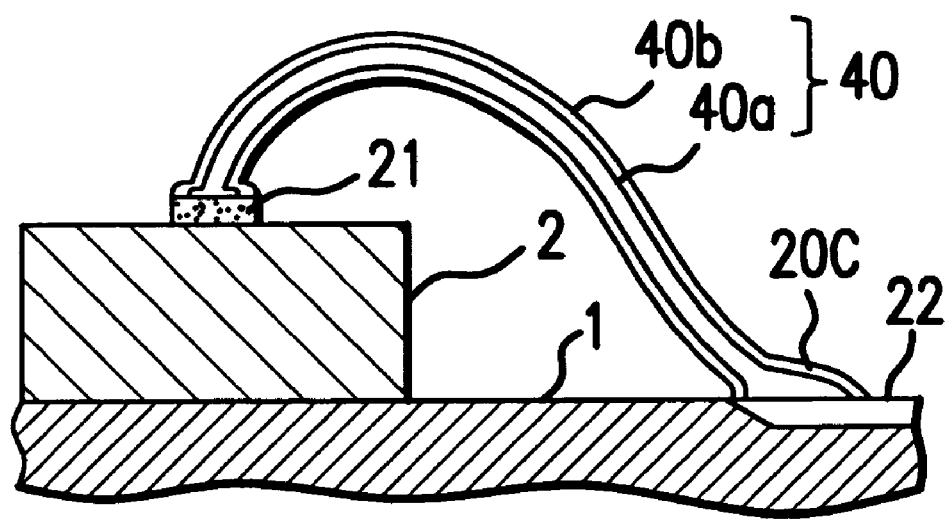

FIGS. 16A–C, FIGS. 17A and B, and FIGS. 18A and B show the former stage, intermediate stage and latter stage, respectively, of the process to form an optical transmission line in the sixth embodiment of the present invention.

First, polyarylate as the optical transmission line forming material 20A for core is put into the tank 11A with heater provided with a temperature controller. Polyarylate is heated up to the temperature, for example, 300° C. so that material is sufficiently melted to have the viscosity of the predetermined value. This tank 11A is connected with a vacuum pipe 17A and a valve 171A for lowering the pressure in the tank 11A for removing the air of polyarylate (20). Therefore, while polyarylate in the tank 11 is melted and becomes the fluid condition because its viscosity is lowered, the air included therein is removed. In the same manner, the silicone resin working as the optical transmission line forming material 20B for clad is put into the tank 11B and inside of the tank 11B is also reduced in pressure by the vacuum pipe 17B and valve 171B for removal of the air. The capillary 121 has an exit 121a for polyarylate at the internal side and an exist 121b for silicone resin surrounding the exist 121a.

Polyarylate and silicone resin in the fluid condition are pushed out to the capillary 121 from the tanks 11A, 11B with each pressurizing means including valves 161A, 161B and screw (refer to FIG. 4). This extrusion path is temperature-controlled to gradually lower the temperature toward the capillary 121 from the tanks 11A, 11B. The end part of capillary 121 is designed a little thicker than the predetermined diameter of the optical transmission terminal. For example, when diameter of the light emitting means of the light emitting element is 10 μm, diameter of core of the optical transmission line is set to about 25 μm and diameter of clad surrounding the clad is set to about 35 μm. Diameter of end part of the capillary 121 is designed to provide the core diameter of about 40 μm and clad diameter of about 50 μm. Moreover, the capillary 121 is also provided, at its surrounding, with a heater 29 for temperature adjustment (refer to FIGS. 9A–FIG. 11B. Not illustrated in FIGS. 15A–18B).

The substrate 1 and the optical and electric integrated circuit 2 mounted on this substrate 1 are fixed on the substrate board 8 controlled to 150 to 180° C.

The capillary 121 moves to the position just above the first optical transmission terminal 21, that is, a light receiving means or a light emitting means. Here the pressurizing control is effectuated on polyarylate and silicone resin and thereby polyarylate and silicone resin are extruded to be placed in contact with the first optical transmission terminal 21. Thereafter, the capillary 121 gradually moves upward while extruding polyarylate and silicone resin by continuously pressurizing polyarylate and silicone resin in such a manner as depicting an arc toward the second optical transmission terminal 22.

The capillary 121 stops pressurization control to the silicon resin immediately before it is placed in contact with the second optical transmission terminal 22 to prevent that polyarylate enters the second optical transmission terminal 22 and that the silicone resin enters the pipe of the second optical transmission terminal 22. When the capillary 121 is placed in contact with the second optical transmission terminal 22, it stops pressurization control to polyarylate and momentarily rotates the screw (refer to FIG. 4) in the inverse direction. Immediately after that, the capillary 121 moves upward to complete the cutting of polyarylate (20) at the second optical transmission terminal 22 during the pulling of the polyarylate and thereby completes the optical connection of core between the first optical transmission terminal 21 and the second optical transmission terminal 22.

Thereafter, the end part of the second optical transmission terminal 22 is coated with silicone resin 20C (refer to FIG. 18B) as a clad material using a dispenser in the same structure as the optical transmission line forming material transfer means shown in FIG. 3. Thereafter, the silicone resin is heated and hardened within the baking furnace of 120 to 150° C., thereby to complete the clad coating.

As an example of modification of the sixth embodiment explained above, the pressurization control to silicone resin is started again, in place of supplying the silicone resin as the clad to the second optical transmission terminal 22 by preparing for the dispenser as explained above, after completing optical connection of the core, polyarylate is surrounded by silicone at the second optical transmission terminal 22, and thereafter pressurization control to silicone resin is stopped again, the screw is momentarily rotated in the inverse direction, immediately after that, the capillary 121 is moved upward to complete the cutting of silicone resin at the second optical transmission terminal 22 during the pulling of the silicone resin in order to complete the optical connection of core between the first optical transmission terminal 21 and second optical transmission terminal 22 and the coating of clad.

After or prior to a series of the processes, each electrical connecting terminal is electrically connected by the wire bonding method of the related art using a gold wire.

Here, the core and clad material supply control at the second optical transmission terminal 22 has been described but it is also possible the method at the first optical transmission terminal 21 that supply of the clad material is once stopped, if required, and then it is started again.

With the structure explained above, while the core and clad are formed simultaneously, optical-connection may be executed.

Crosstalk within the optical transmission line can be reduced by providing the clad layer in the optical transmission line as explained above.

Seventh Embodiment

Figure 19:
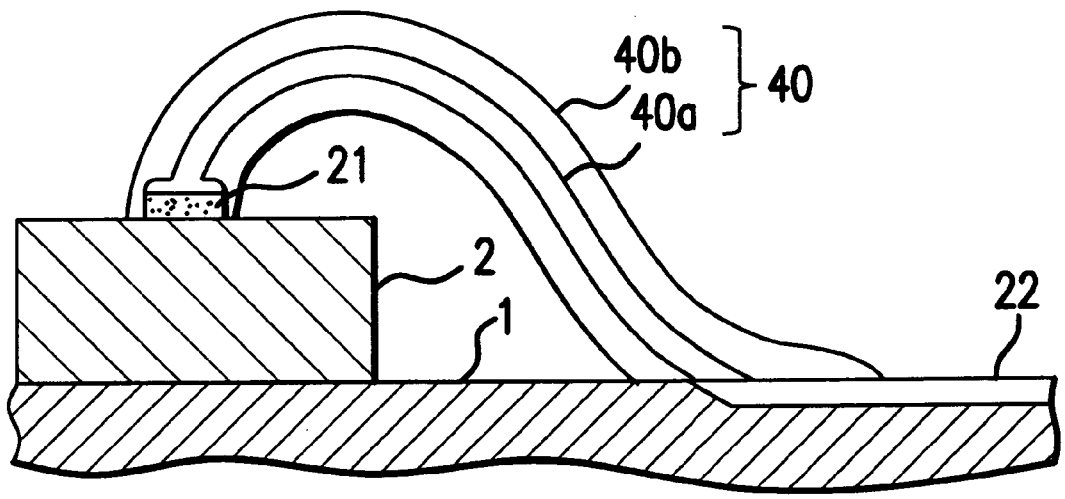
FIG. 19 is a schematic diagram illustrating a modification example of the seventh embodiment of the present invention.

FIG. 19 is a schematic diagram illustrating the optical transmission line formed by the seventh embodiment.

In the optical transmission line forming process utilizing the capillary, only the core 40a of the optical transmission line is formed of polyarylate utilizing the optical transmission line forming material transfer means in the structure shown in FIG. 3 and thereafter the optical transmission line 40 consisting of the core 40a and clad 40b is completed by coating the optical transmission line consisting of only the core 40a with silicone as the clad material in every optical transmission line using the dispenser in the same structure as the optical transmission line forming material transfer means shown in FIG. 3 and then thermally hardening silicone in the baking furnace heated up to 120 to 150° C. As described above, core and clad may be formed by individual processes.

Figure 20:
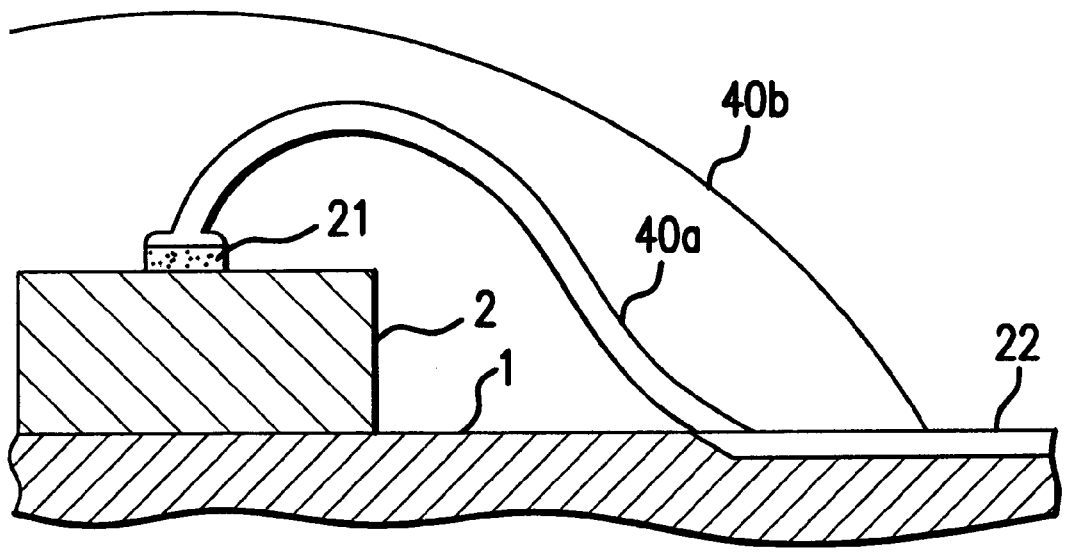
FIG. 20 is a schematic diagram illustrating a modification example of the seventh embodiment of the present invention.
Figure 21:
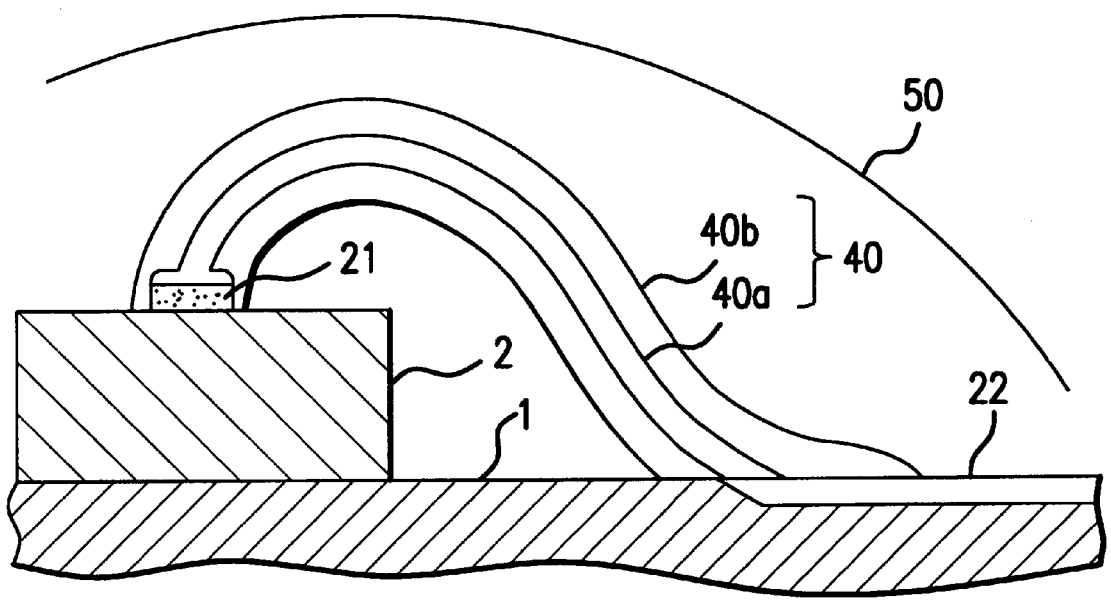
FIG. 21 is a schematic diagram illustrating an example of formation of a light shielding layer.

FIG. 20 is a schematic diagram illustrating another modification of the seventh embodiment.

Here, the clad 40b is formed to cover the entire part of a plurality of cores 40a, in place of individual core 40a.

Figure 22:
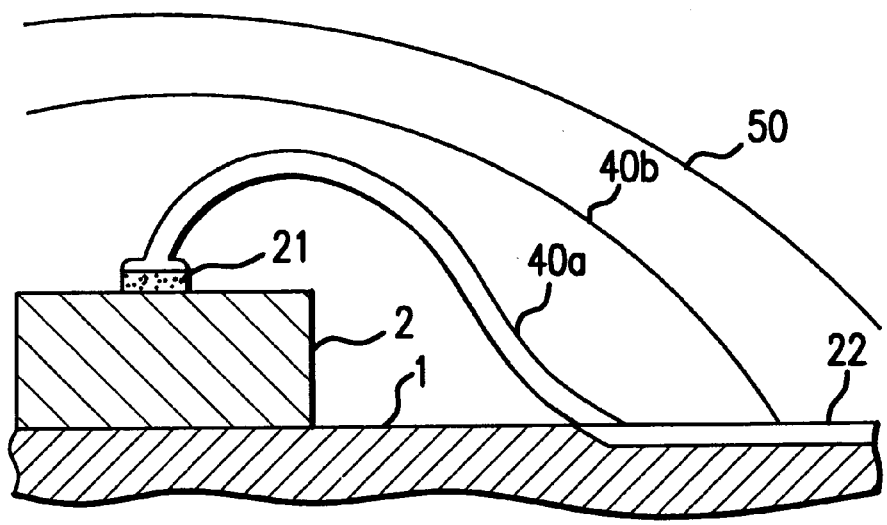
FIG. 22 is a schematic diagram illustrating an example of formation of a light shielding layer.
Figure 23:
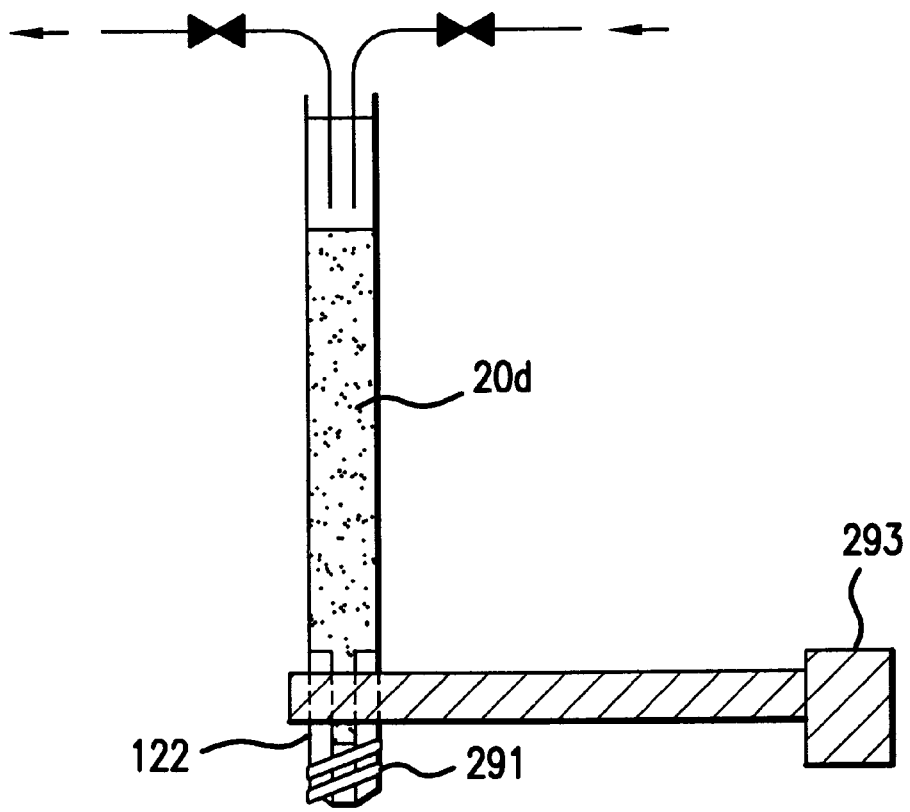
FIG. 23 is a schematic structural diagram of an optical transmission line forming material transfer means in the eighth embodiment of the present invention.

FIG. 22 and FIG. 23 are schematic diagrams illustrating an example of the formation of a light shielding layer.

As explained above, after the clad 40b covering the core 40a is formed, the light shielding resin, for example, the resin obtained by mixing black pigment into the silicone resin is supplied from the dispenser to cover the clad 40b to form a light shielding layer 50. Thereby, crosstalk in the optical transmission line can further be lowered.

Eighth Embodiment

FIG. 23 is a schematic structural diagram of the optical transmission line forming transfer means in the eighth embodiment of the present invention.

First, polyarylate powder 20d is introduced into the capillary 122 provided, at its end part, with a heater 291 for temperature adjustment. The capillary 122 is also provided with an ultrasonic vibrator 293 and the polyarylate powder 20d supplied from the inlet of capillary 122 densely fills the capillary 122 up to the end part thereof through ultrasonic vibration.

Next, the end part of the capillary 122 is heated up to about 270 to 350° C. to fuse the polyarylate powder 20d to have the predetermined viscosity. Fused polyarylate is in the fluid condition and is a little extruded from the end part of the capillary 122. The capillary 122 is then moved up to the position just above the first optical transmission terminal, that is, the light receiving or light emitting means and the end part thereof 122 is placed in contact with the first optical transmission terminal. Thereafter, the end part of the capillary 122 slowly moves upward extruding polyarylate therefrom to continuously supply polyarylate in the fluid condition under the heated condition in such a manner as depicting an arc toward the second optical transmission terminal. When the end part of the capillary 122 is placed in contact with the second optical transmission terminal, heating of capillary 122 is stopped (or temperature is a little lowered by the stop or cooling mechanism). Upon completion of heating of the capillary 122, fused polyarylate is no longer in the fluid condition and it is therefore cut at the end part of the second optical transmission terminal.

Reduction of density in the capillary due to the melting of polyarylate powder or supply of melted polyarylate from the end part of capillary 122 is compensated by the supplement of material from the inlet of the capillary 122 by means of ultrasonic vibration while the capillary 122 moves next up to the first optical transmission terminal (to the next bonding area).

Shape of capillary 122 and heating process for the substrate 1 and photoelectric integrated circuit 2 mounted on the substrate 1 are similar to the other embodiments explained above and repeated explanation will be omitted here. Moreover, the similar optical connection may be assured even by supplying polyarylate wire material, in place of polyarylate powder, to the end part of the capillary and then melting such material for use.

Figure 24:
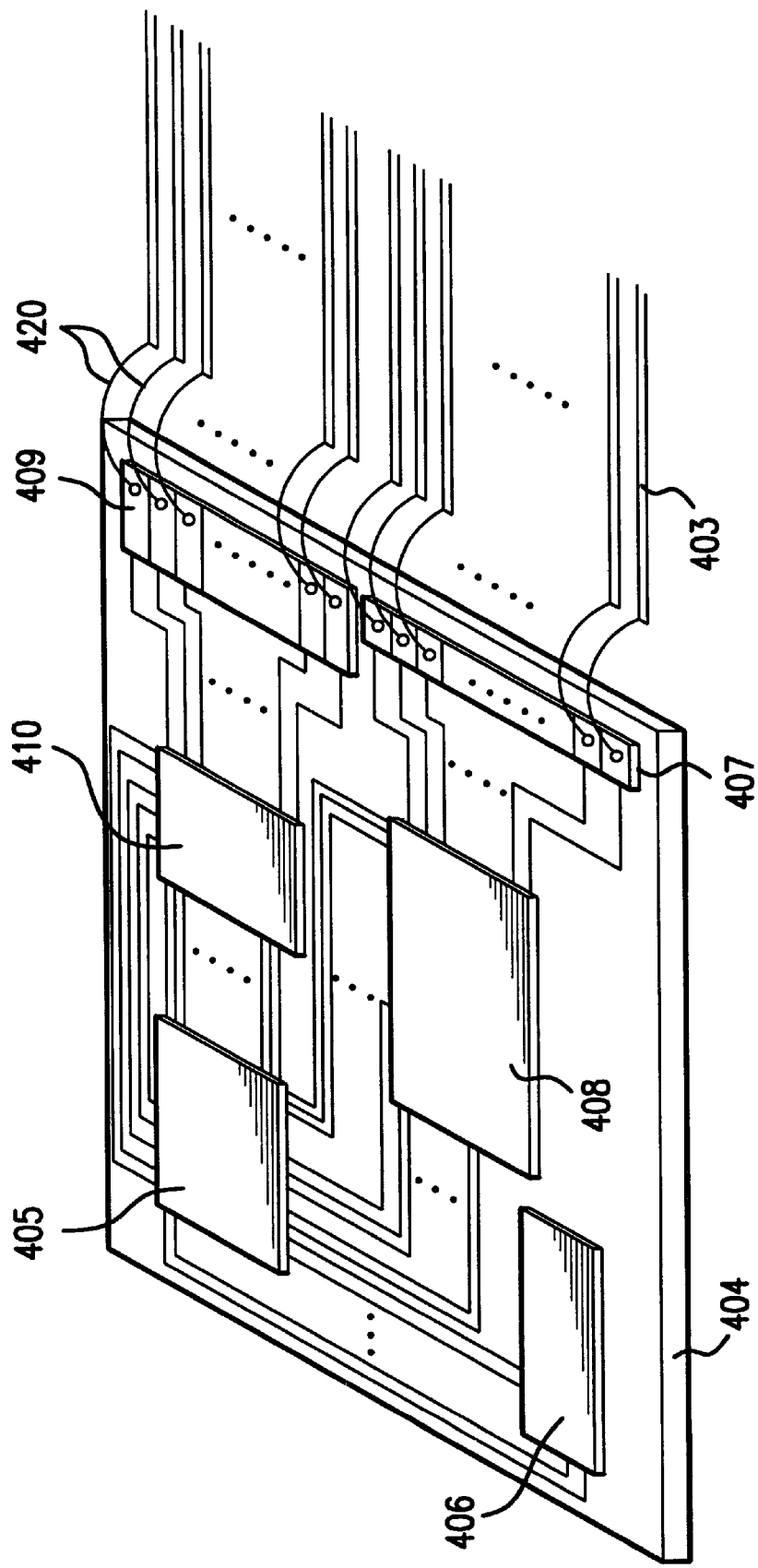
FIG. 24 is a schematic diagram illustrating an example of an signal processing apparatus of the present invention.

FIG. 24 is a schematic diagram illustrating the optical MCM (Multi Chip Module) as a embodiment of the signal processing apparatus.

The optical MCM 404 is comprised of CPU 405, memory 406, semiconductor laser array 407, photo diode array 409, laser driver 408 and photo diode driver 410. The optical MCM and/or the optical IC are connected with the optical wave guide 403. The light signals are transmitted to or received by the optical MCM or the optical IC through the optical wave guide 403.

Between the semiconductor laser array 407, the photo diode 409 and optical wave guide 403, the optical transmission line 420 of this invention, formed with the coagulative optical transmission line forming material in the fluid condition , is provided. The electric signal is converted to the light signal by the semiconductor laser. And the light signal is inputted into the optical wave guide passing through the optical transmission line 420 and transmitted to the optical MCM or the optical IC. In the same way, the light signals from the optical MCM or the optical IC are inputted into the photo diode array 409 through the optical wave guide 403 and the optical transmission line 420 of this invention, then the light signal is converted to the electric signal. Besides, by the use of a plurality of the optical MCM 404 and by processing signals in parallel with them, the higher performance image processing apparatus can be provided.

As explained above, in the present invention, since the optical transmission line is formed with an optical transmission line forming material in the fluid condition, the optical transmission line forming material is never broken at the bending area and peeling of bonded area can also be prevented because any shearing stress never applied to the optical transmission terminal. Moreover, since the present invention introduces the process similar to the wire bonding process used for electrical circuits in the related arts, the connecting process as a whole including the positioning process can be fully automated like the wire bonding process of the related art using a gold wire. Therefore, in comparison with the connecting method using optical fiber which has been proposed in the related art, the assembling processes and adjusting processes can be simplified and reduced in the number of processes to realize low cost and highly reliable optical connection.

Although preferred embodiments of the present invention have been described and illustrated, it will be apparent to those skilled in the art that various modifications may be made without departing from the principles of the invention.

What is claimed is:

1. An optical circuit wherein an optical transmission line connects optical transmission terminals located on a substrate surface to perform an optical transmission via said optical transmission line, wherein at least a portion of said optical transmission line that connects the optical transmission terminals is positioned above the substrate surface, and wherein the optical transmission line comprises coagulative optical transmission line forming material.

2. The optical circuit of claim 1, wherein the optical transmission line depicts an arc above the surface of the substrate.

3. The optical circuit of claim 1, wherein the optical transmission line comprises at least two coagulative materials.

4. The optical circuit of claim 3, wherein a first coagulative material forms a core and is surrounded by a second coagulative material forming a cladding.

5. The optical circuit of claim 4, comprising a plurality of optical transmission lines, at least two of the plurality of optical transmission lines having the same cladding.

6. The optical circuit of claim 1, further comprising a light shield.

7. The optical circuit of claim 6, wherein the light shield comprises black pigment.

8. The optical circuit of claim 1, wherein at least one of the optical transmission terminals comprises a thin film waveguide extending along the substrate surface and the optical transmission line is tangent to the thin film waveguide.

9. The optical circuit of claim 1, wherein the optical transmission line extends in a direction perpendicular to the substrate surface at at least one of the optical transmission terminals.

10. The optical circuit of claim 1, wherein the coagulative material comprises at least one of PMMA, polyarylate, Upolymer, polysulfon, polyethersulfon, polymethyl methacrylate, polycarbonate, amorphousorefin, glass, silicon resin, polyester, polyethylene telephtalate, acryl, polyamide and polystyrene.

11. A signal processing apparatus providing an optical circuit having an optical transmission line between optical transmission terminals located on a substrate surface to perform optical transmission via said optical transmission line, wherein at least a portion of said optical line that connects the optical transmission terminals is positioned above the substrate surface, and wherein said optical circuit comprises coagulative optical transmission line forming material.

12. The optical circuit of claim 11, wherein the optical transmission line depicts an arc above the surface of the substrate.

13. The optical circuit of claim 11, wherein the optical transmission line comprises at least two coagulative materials.

14. The optical circuit of claim 13, wherein a first coagulative material forms a core and is surrounded by a second coagulative material forming a cladding.

15. The optical circuit of claim 14, comprising a plurality of optical transmission lines, at least two of the plurality of optical transmission lines having the same cladding.

16. The optical circuit of claim 11, further comprising a light shield.

17. The optical circuit of claim 16, wherein the light shield comprises black pigment.

18. The optical circuit of claim 11, wherein at least one of the optical transmission terminals comprises a thin film waveguide extending along the substrate surface and the optical transmission line is tangent to the thin film waveguide.

19. The optical circuit of claim 11, wherein the optical transmission line extends in a direction perpendicular to the substrate surface at at least one of the optical transmission terminals.

20. The optical circuit of claim 11, wherein the coagulative material comprises at least one of PMMA, polyarylate, Upolymer, polysulfon, polyethersulfon, polymethyl methacrylate, polycarbonate, amorphousorefin, glass, silicon resin, polyester, polyethylene telephtalate, acryl, polyamide and polystyrene.

* * * * *